US011084226B2

(12) United States Patent
Poschner et al.

(10) Patent No.: US 11,084,226 B2
(45) Date of Patent: Aug. 10, 2021

(54) SECURING A SECOND OBJECT TO A FIRST OBJECT

(71) Applicant: MultiMaterial-Welding AG, Stansstad (CH)

(72) Inventors: Patricia Poschner, Uettlingen (CH); Joakim Kvist, Nidau (CH); Patrick Mooser, Biel (CH)

(73) Assignee: MULTIMATERIAL-WELDING AG, Stansstad (CH)

(*) Notice: Subject to any disclaimer, the term of this patent is extended or adjusted under 35 U.S.C. 154(b) by 213 days.

(21) Appl. No.: 16/318,236

(22) PCT Filed: Jul. 21, 2017

(86) PCT No.: PCT/EP2017/068455
§ 371 (c)(1),
(2) Date: Jan. 16, 2019

(87) PCT Pub. No.: WO2018/015527
PCT Pub. Date: Jan. 25, 2018

(65) Prior Publication Data
US 2019/0168464 A1    Jun. 6, 2019

(30) Foreign Application Priority Data
Jul. 21, 2016 (CH) .................... 00947/16

(51) Int. Cl.
B29C 65/08        (2006.01)
B32B 3/12         (2006.01)
(Continued)

(52) U.S. Cl.
CPC ........ B29C 65/08 (2013.01); B29C 66/02241 (2013.01); B29C 66/30325 (2013.01);
(Continued)

(58) Field of Classification Search
CPC ............... B29C 65/08; B29C 66/0224; B29C 66/02241; B29C 66/02242;
(Continued)

(56) References Cited

U.S. PATENT DOCUMENTS 4,027,370 A    6/1977  Bachar
5,965,238 A   10/1999  Saitoh et al.
7,807,093 B2 * 10/2010  de Groot ............... B29C 66/474
                                                        264/445

FOREIGN PATENT DOCUMENTS

DE    10 2005 060 528      7/2006
GB         2421556 A  *  6/2006  ........... B29C 66/474
(Continued)

OTHER PUBLICATIONS

Switzerland Search Report dated Oct. 28, 2016, Application No. CH 9472016, 3 pages.
(Continued)

Primary Examiner — Michael A Tolin
(74) Attorney, Agent, or Firm — Rankin, Hill & Clark LLP

(57) ABSTRACT

A method of anchoring a connector in a first object includes providing the connector, the connector having a liquefiable material that is liquefiable by mechanical vibration, such as a thermoplastic material, bringing the connector into contact with low density layer that has an arrangement of discrete elements and gas-filled (empty) spaces between the discrete elements, pressing the connector against the low density layer and coupling mechanical vibration energy into the connector to cause the connector to penetrate into the low density layer to deform the discrete elements, until a flow portion of the liquefiable material becomes flowable and is caused to interpenetrate spaces between the deformed discrete elements so that an intertwined structure of the liquefiable material and the deformed discrete elements results,
(Continued)

and stopping the mechanical vibration energy and causing the flow portion to re-solidify to anchor the connector in the low density layer.

23 Claims, 12 Drawing Sheets

(51) Int. Cl.
| | |
|---|---|
| *F16B 5/01* | (2006.01) |
| *B29C 65/00* | (2006.01) |
| *F16B 19/08* | (2006.01) |
| *B32B 37/14* | (2006.01) |
| *B29L 1/00* | (2006.01) |
| *B29L 24/00* | (2006.01) |
| *B29L 31/60* | (2006.01) |
| *F16B 11/00* | (2006.01) |
| *F16B 37/04* | (2006.01) |

(52) U.S. Cl.
CPC ...... *B29C 66/30326* (2013.01); *B29C 66/474* (2013.01); *B29C 66/727* (2013.01); *B29C 66/72521* (2013.01); *B29C 66/72525* (2013.01); *B29C 66/7392* (2013.01); *B29C 66/8322* (2013.01); *B32B 3/12* (2013.01); *B32B 37/146* (2013.01); *F16B 5/01* (2013.01); *F16B 19/086* (2013.01); *B29C 2793/0045* (2013.01); *B29C 2793/0081* (2013.01); *B29L 2001/005* (2013.01); *B29L 2024/003* (2013.01); *B29L 2031/608* (2013.01); *B32B 2305/024* (2013.01); *F16B 11/006* (2013.01); *F16B 37/048* (2013.01)

(58) Field of Classification Search
CPC ........ B29C 66/30325; B29C 66/30326; B29C 66/474; B29C 66/72521; B29C 66/72523; B29C 66/72525; B29C 66/7254; B29C 66/727; B29C 66/7392; B29C 66/73921; B29C 66/8322; B29C 2793/0045; B29C 2793/0054; B29C 2793/0081; B29L 2001/005; B29L 2024/003; B29L 2024/006; B29L 2031/608; B32B 3/12; B32B 5/26; B32B 37/146; B32B 2305/024; F16B 5/01; F16B 11/006; F16B 19/086; F16B 37/048
See application file for complete search history.

(56) References Cited

FOREIGN PATENT DOCUMENTS

| | | |
|---|---|---|
| WO | 93/12344 | 6/1993 |
| WO | 98/42988 | 10/1998 |
| WO | 00/79137 | 12/2000 |
| WO | 2008/080238 | 7/2008 |
| WO | 2010/072009 | 7/2010 |
| WO | 2015/135824 | 9/2015 |
| WO | 2015/162029 | 10/2015 |
| WO | 2017/162693 | 9/2017 |

OTHER PUBLICATIONS

English translation of International Preliminary Report on Patentability dated Jan. 22, 2019 (Jan. 22, 2019), Application No. PCT/EP2017/068455, 9 pages.

* cited by examiner

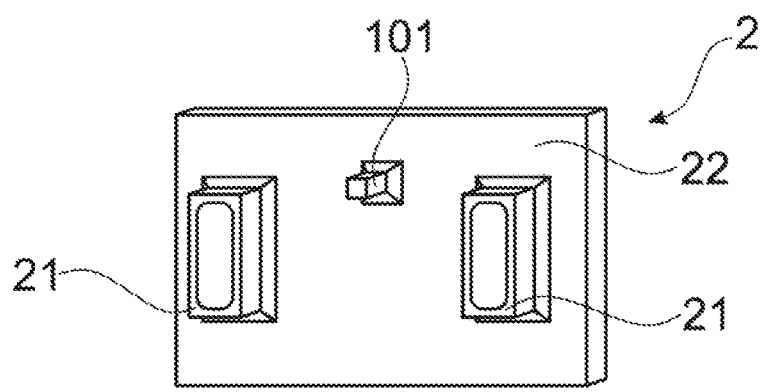
Fig. 23
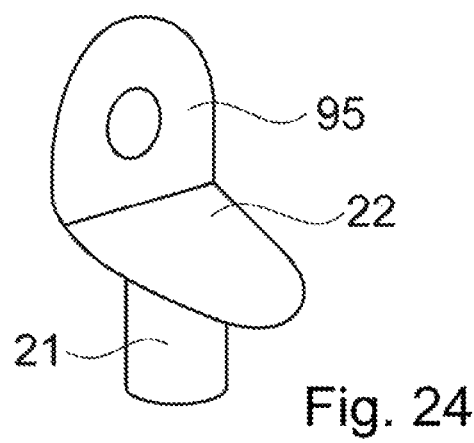
Fig. 24
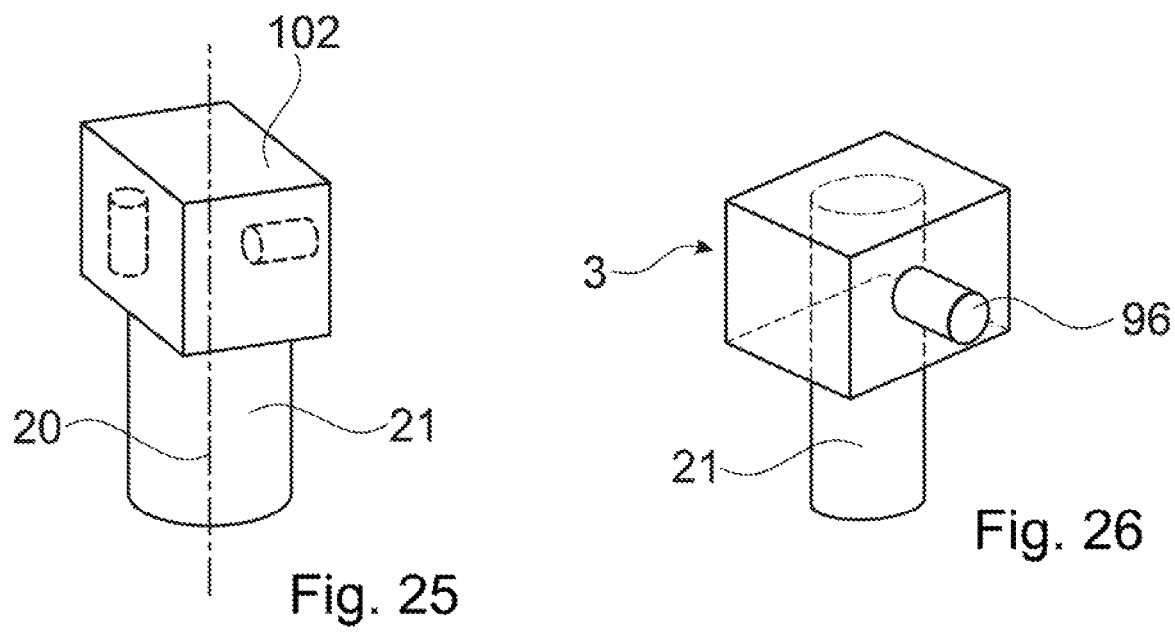
Fig. 25
Fig. 26

SECURING A SECOND OBJECT TO A FIRST OBJECT

BACKGROUND OF THE INVENTION

Field of the Invention

The invention is in the fields of mechanical engineering and construction, especially mechanical construction, for example automotive engineering, aircraft construction, building of railroad wagons and locomotives, shipbuilding, machine construction, toy construction etc. In particular, it relates to a method of mechanically securing a second object to a first object.

Description of Related Art

In the automotive, aviation and other industries, there has been a tendency to move away from steel-only constructions and to use lightweight material instead.

An example of new building material elements are lightweight building elements that comprise two outer, comparably thin building layers, for example of a fiber composite, such as a glass fiber composite or carbon fiber composite, a sheet metal or also, depending on the industry, of a fiberboard, and a middle layer (interlining) arranged between the building layers, for example a honeycomb structure of cardboard or other material, or a lightweight metallic foam or a polymer foam or ceramic foam, etc., or a structure of discrete distance holders. Lightweight building elements of this kind may be referred to as "sandwich boards" and are sometimes called "hollow core boards (HCB)". They are mechanically stable, may look pleasant and have a comparably low weight.

Also other building elements that are comparably lightweight, like the interlining layer of the mentioned sandwich boards, include building layers that have a comparably low density by having gas-filled cavities, such as, for example, foam materials.

The new materials cause new challenges in bonding elements of these materials—for example in bonding flattish object to another object. An example for this is the bonding of reinforcements ("stringers" or the like) to flattish sandwich board constructions in the automotive, aviation, shipbuilding and other industries or for providing anchoring points for hinges, screws, bolts etc. in the sandwich board.

Further, according to the state of the art, reinforcements in sandwich board constructions have to be provided during their manufacture, and also connecting elements have to be added during manufacturing. If they are subsequently added, the sandwich core has to be foam-filled subsequently to fastening the connector, which is costly and time consuming.

To meet these challenges and to eliminate possible disadvantages, the automotive, aviation and other industries have started heavily using adhesive bonds. Adhesive bonds can be light and strong but suffer from the disadvantage that there is no possibility to long-term control the reliability, since a degrading adhesive bond, for example due to an embrittling adhesive, is almost impossible to detect without entirely releasing the bond. Also, adhesive bonds may lead to a rise in manufacturing cost both because of material cost and because of delays caused in manufacturing processes due to slow hardening processes, especially if the surfaces to be connected to each other have certain roughness and as a consequence the quickly hardening thin-layer adhesives cannot be used. Also, the strength of adhesive bonds depends on the strengths of the outermost layers of the elements to be connected.

WO 93/12344 discloses a method of securing a holding part in a recess of a prefabricated part with a core of thermoplastic material, for example having a honeycombed structure. The holding part is pressed into the prefabricated part and rotated until the holding part is welded to the core. This method is restricted to applications on thermoplastic core materials so that the necessary weld may arise. Also, the core layer is molten where the holding part penetrates, and therefore the holding part is anchored with respect to the core layer only along its periphery, whereby the core layer needs a substantial density for the holding part to be anchored with sufficient anchoring strength. Similarly, WO 2015/162029 discloses approaches for setting a setting element that is rotated to be driven into a component to produce a welding joint. Also this method comprises anchoring the setting element along its periphery only, and this limits the anchoring strength, depending on the material of the component.

SUMMARY OF THE INVENTION

It is therefore an object of the present invention to provide a method of mechanically securing a connector to a first object, the method overcoming disadvantages of prior art methods. Especially, it is an object of the present invention to provide a method of mechanically securing a connector to a lightweight building element, which method has the potential of being low-cost, efficient and quick, and with substantial anchoring strength also if the core layer of the lightweight building element has a low density.

According to an aspect of the invention, a method of anchoring a connector in a first object is provided, wherein the first object has a first building layer and a low density layer adhering to the building layer, the low density layer has a structure that includes gas-filled cavities, wherein a first density of the first building layer is higher than a second density of the low density layer, the method comprising:
  providing the first object and providing the connector, the connector having a liquefiable material that is liquefiable by mechanical vibration, such as a thermoplastic material;
  bringing the connector into contact with the low density layer;
  pressing the connector against the low density layer and coupling mechanical vibration energy into the connector to cause the low density layer to be compressed between the connector and the first building layer to yield a compressed portion of the low density layer, wherein the compressed portion has a compressed structure, until a flow portion of the liquefiable material becomes flowable and is pressed into structures of the compressed portion;
  stopping the mechanical vibration energy and cause the flow portion to re-solidify to anchor the connector in the compressed portion that maintains the compressed structure.

Especially, the compressed structure may have a density higher than the second density.

The building layer will be thinner and more dense (and generally also harder as far as the average hardness of the low density layer is defined) than the low density layer.

The low density layer may according to a first group of examples be a layer formed by a solid foam, for example a metallic or plastic (but not liquefiable) foam layer.

In a second group of examples, the low density layer has a structure of elements a first material (for example cardboard or other fibrous structure or a plastic material or thin sheet metal) and an adhesive of a second material. The second material may especially be a foam.

For example in WO 2008/080238 and in WO 2010/072009 it has been proposed to anchor a connector that comprises thermoplastic material in a sandwich board by making a bore in the sandwich board, which bore reaches through one of the building layers and the interlining layer, and by subsequently liquefying a portion of the thermoplastic material to anchor the connector relative to both, the first and second building layers. This approach, however, features the disadvantage that depending on the sandwich board construction there is only very limited first/second building layer material to which the connector may bond, due to the small thickness. On the other hand, the interlining material does generally not have sufficient density and stability for the anchoring to take place in it.

The present invention solves this dilemma by proposing to press the connector into the low density layer (which may be an interlining layer of a sandwich board) and to, for example, use the fact that thereby the low density layer is locally deformed to yield structures that are suitable of being interpenetrated by the thermoplastic material.

The low density layer also provides mechanical resistance that is necessary for the operator to be able to apply a pressing force. The pressing force is necessary for sufficient friction (external and possibly also internal friction) to be caused when the mechanical vibrations act. Due to the approach according to the invention, the pressing force may be such as to rise as a distal end of the connector approaches the first building layer due to a rising compression of the low density layer where it is in contact with the distal end.

Even though the interlining is comparably soft, it has been observed that if the flow portion is sufficiently large, this will lead to a strong anchoring, in the material of the low density layer by the flow portion interpenetrating deformed portions of the low density layer. Thus, after re-solidification, a common structure of the liquefiable material intertwined with the deformed portions of the low density layer results. In addition to a possible adherence of the liquefiable material to the deformed portions, this will also result in a positive-fit connection, because even if the low density layer initially consisted of vertical structures only, the deformation will inevitably cause undercuts.

In contrast to approaches as the hereinbefore discussed prior art approaches in which the connector is pressed into the low density layer while being rotated, the approaches according to aspects of the present invention are based on the combination of a pressing force with mechanical vibration, for example longitudinal vibration. Due to this, the material of the low density layer is not ousted and displaced outwards with respect to the connector, as is often the case for rotated connectors but the material of the low density layer remains in a lateral position where it can be interpenetrated by the liquefiable material and thereby contribute to the anchoring. Thus, the claimed approach provides substantial advantages over the prior art, especially for low density layers of very small density.

According to a second aspect of the invention, a method of anchoring a connector in a first object is provided, wherein the first object includes a low density layer that includes an arrangement of discrete elements and gas-filled (empty) spaces between the discrete elements, the method comprising:

Providing the first object and providing the connector, the connector having a liquefiable material that is liquefiable by mechanical vibration, such as a thermoplastic material;

Bringing the connector into contact with the low density layer;

Pressing the connector against the low density layer and coupling mechanical vibration energy into the connector to cause the connector to penetrate into the low density layer, until a flow portion of the liquefiable material becomes flowable and is caused to interpenetrate spaces between the deformed discrete elements so that an intertwined structure of the liquefiable material and the discrete elements results;

Stopping the mechanical vibration energy and causing the flow portion to re-solidify to anchor the connector in the low density layer.

The discrete elements are discrete in that they have portions where they are separated from the other elements by the gas-filled spaces. This does not exclude that the elements are in physical contact with each other. In embodiments (for example when the discrete structures are of a plastic material) it is even possible that the elements or some of the elements are one-piece with each other (physical continuity not excluded). Especially, the discrete element may extend essentially vertically, i.e. approximately parallel to the direction of the pressing force (the proximodistal direction). The discrete elements may for example form a pattern of walls extending vertically.

In embodiments, the step of pressing the connector against the low density layer and coupling mechanical vibration energy into the connector to penetrate into the low density layer may include doing so to deform the discrete elements, wherein the resulting intertwined structure is an intertwined structure of the liquefiable material and the deformed discrete elements.

In other embodiments, however, the discrete elements need not necessarily become substantially deformed during the process. This especially pertains to discrete elements that form essentially vertical walls, i.e. walls extending essentially perpendicular to the plane defined by the layer(s). Especially if the walls that constitute the discrete elements are connected to a stabilizing structure, for example a honeycomb structure. Proximal edges of the walls in these embodiments have energy directing characteristics, i.e. the thermoplastic material of the connector tends to become liquefied predominantly where in contact with the proximal edges of the walls, whereby the connector may be continuously pressed into the low density layer.

Especially, in embodiments the step of pressing the connector against the low density layer and coupling mechanical vibration energy into the connector may be carried out without any substantial rotation of the connector. Thereby, the vertical walls may remain essentially intact without being displaced in the process, and thereby the strength of them and of their being anchored in the first object may be used for anchoring the connector.

More in general, the discrete elements may for example be one- or two-dimensional and may at least partially extend vertically. Example of such elements include elements of cardboard or other fibrous structure or a plastic material or thin sheet metal.

Especially, the low density layer may be an interlining layer of a sandwich board, which sandwich board in addition to the interlining layer includes a first building layer and a second building layer, the first and second building layers sandwiching the low density layer. The first and second building layers are thinner and more dense (and generally also harder as far as the—average—hardness of the low density layer is defined) than the low density layer.

In these embodiments, the low density layer will often take up a large portion of the overall volume of the first object, for example at least 70%.

Especially, in such embodiments, the method may include providing the first object with a portion of the second (proximal) building layer removed to yield an access hole and thereby an exposed portion of the low density layer. To this end, the method may include the step of removing a portion of the second building layer, for example by drilling.

The exposed portion of the low density layer especially is immediately underneath the second building layer, whereby the connector is capable of being pressed against and into the low density layer by a vertical (distal) movement through the access hole.

The removed portion may define an attachment location of the first object, wherein the step of bringing the connector into contact with the low density layer includes bringing the connector into contact with the first object at and/or around the exposed portion.

The access hole may in embodiments be undersized with respect to the dimensions of the connector, i.e. with respect to a horizontal cross section of the connector.

According to a third aspect of the invention, a method, for example according to the first and/or second aspect, of anchoring a connector in a first object is provided, wherein the first object is a sandwich board including a first building layer, a second building layer, and a low density layer sandwiched between the first and second building layers, the low density layer including a structure of elements and gas-filled spaces, the method including:

providing the first object with the second building layer locally removed or disrupted to yield an access hole in the second building layer to gain access to the low density layer, without removing the low density layer;

providing the connector, the connector having a liquefiable material that is liquefiable by mechanical vibration, such as a thermoplastic material;

bringing the connector into contact with the low density layer;

pressing the connector against the low density layer and coupling mechanical vibration energy into the connector to cause the connector to penetrate into the low density layer, until a flow portion of the liquefiable material becomes flowable and is caused to interpenetrate spaces between the elements so that an intertwined structure of the liquefiable material and the elements results; and stopping the mechanical vibration energy and causing the flow portion to re-solidify to anchor the connector in the low density layer.

Especially, in embodiments, the step of pressing and coupling vibration energy into the connector may also cause a deformation of the elements, wherein the interpenetrated spaces are spaces between the deformed elements, so that an intertwined structure of the liquefiable material and the deformed elements results.

The deformation of the elements may be any deformation, including a disruption (if the elements are comparably brittle), a deformation that includes an at least partial softening or melting due to heat input, a combination of disruption and/or plastic deformation and/or displacement of disrupted portions, etc. The deformation of the elements may set in prior to the onset of the liquefaction of the connector material or simultaneously or thereafter. Especially, it is not excluded that the connector is advanced into the low density layer as an effect of being softened and/or liquefied. For example, if the elements form a Nomex® honeycomb (or other Nomex wall structure), the elements may be caused to collapse only by the impact of the mechanical vibration, whereas for Polypropylene honeycomb elements (or other PP wall structure), the heat input generated by the friction between the connector and the elements is often required for the elements to collapse.

Alternatively, as discussed hereinbefore for the second aspect, the elements need not necessarily become substantially deformed during the process, especially if they form essentially vertical walls. The step of pressing the connector against the low density layer and coupling mechanical vibration energy into the connector may be carried out without any substantial rotation of the connector.

The above-described approach of providing the first object with a proximal (second) building layer that is locally at least partially removed (this may be done when the first object is manufactured or thereafter, for example as a step of the method by drilling, milling or other removal step) is applicable also for embodiments in which the first object does not include a first, distal building layer and also for embodiments in which the elements of the low density layer are sufficiently stable so that the process does not lead to substantial deformation of the elements.

Such a step of providing the first object with a proximal building layer locally removed to yield an access hole to the low density material with gas-filled spaces underneath will include leaving the low density material/low density layer at least partially intact.

For the step of bringing the connector into contact with the low density layer, the second building layer that faces towards the proximal direction, i.e. the direction from which the connector is brought into contact with the first object and from which the pressing force acts, may be locally removed prior to bringing the connector into contact with the low density layer, to allow for a direct, ab-initio contact between the connector and the low density layer without having to apply a large force. This includes the possibility that the first object is ab initio manufactured with the access hole. Alternatively, the connector may be used to locally disrupt the second building layer, as described in international patent application PCT/EP2017/056734, incorporated herein by reference (in this application, the terminology is slightly different, and what is called "second building layer" in the present text is the "first building layer" in PCT/EP2017/056734).

What follows pertains to all aspects of the invention, unless explicitly specified otherwise:

Elements of the low density layer that are deformed by the connector being pressed into it are, for example, deformed irreversibly and/or plastically, by being buckled, disrupted, compressed, etc. Especially, the deformation of the elements is different from a predominantly elastic deformation, as would be the case for example for elastomeric elements.

A further effect that can be used in embodiments is that a connection between a low density layer—a large volume portion of which is made up by gas-filled spaces—and a building layer in many materials includes a foaming adhesive. The adhesive by definition adheres well to both, the respective building layer and to the low density layer. The flow portion of the thermoplastic material may connect to the foaming adhesive of the low density layer by one or more of the following:

a weld between the flow portion and the adhesive, if the adhesive has a material suitable of being welded to the liquefiable material;

an adhesive connection between the flow portion and the adhesive;

a penetration of structures within the adhesive by the flow portion, for example of pores if the adhesive is open porous;

a penetration of structures generated between different portions of the adhesive and/or between portions of the adhesive and other parts of the low density layer.

Apart from the fact that the adhesive may optionally be thermoplastic and capable of welding to the connector material, the material of the interlining suitable for the process in many embodiments be solid at least under the conditions of the method according to the invention.

The method may include the further step of maintaining the pressing force for some time after the step of stopping the mechanical vibration. In a group of embodiments, the pressing force after the vibrations have stopped is even larger than the force applied while the vibrations act. In embodiments, the pressing force during the process follows a profile and is raised in a controlled manner while the connector moves forward into the low density material.

Maintaining the pressing force for some time after the step of stopping the energy transfer may be done at least until the flow portion has lost its capability of flowing, which, depending on the dimension of the connector and on heat conducting properties of the first object, may be the case within typically a few seconds.

However (this pertains to the first and third aspects and embodiments of the second aspects that further include a first building layer distally of the low density layer), generally the pressing force profile will be chosen so that the first building layer is not penetrated by the connector. The first building layer may remain intact, without substantial deformation.

In embodiments, the low density layer may include a macroscopic structure of walls extending vertically with respect to the proximodistal direction (with respect to the first building layer, if any), and the compressed portion includes such walls in a collapsed state.

In embodiments, the connector geometry may be such that towards the distal end it is hollow and sleeve-like.

More in general, the connector will often have an initially sharp edge that may circumferential or interrupted and may run along the outermost periphery of the connector or may alternatively be offset towards radially-inward.

In other embodiments, the connector is not sleeve-like but has an essentially material-filled shaft.

The connector does not necessarily have a round cross section. Rather, it may have a different shape, for example elongate, polygonal, T-shaped. H-shaped, U-shaped, etc.

The connector includes the liquefiable material, for example thermoplastic material. In embodiments, the connector consists of thermoplastic material.

In other embodiments, the connector in addition to the liquefiable (for example thermoplastic) material includes a body of a not liquefiable material.

In embodiments with a not liquefiable body, the body of the not liquefiable material is different from a mere filler of a large number of particles but is a macroscopic body with a defined position and orientation and of a substantial size of, for example, at least 10% of a connector volume, and/or with a characteristic dimension of at least 0.1 mm in any dimension. Especially, the body may be metallic or ceramic. Especially, the body may be such as to have a defined shape and to thereby add stiffness to the connector. By the body, the connector is defined into at least two spatially separated regions, namely the body region and the thermoplastic region.

Such a body of not liquefiable material may carry structures serving for further functions, such as a thread, another mechanical connection, a contact or feedthrough, etc.

Especially, such a body may include a nut or bolt embedded in a thermoplastic portion.

In embodiments, the body has a surface with at least one locking feature on a lateral surface, which locking feature cooperates with the thermoplastic material in the body to stabilize the relative position of the body, within embedding thermoplastic material.

In embodiments in which the connector in addition to the thermoplastic material includes not liquefiable material, the thermoplastic material may be arranged at least on surface portions that come into contact with the interlining layer. Alternatively, the thermoplastic material may be arranged or arrangeable in an interior, and the body may include a fenestration through which the thermoplastic material may be pressed out to be brought into contact with interlining layer.

The energy transferred to the connector is mechanical vibration energy. To this end, the connector may have a proximal, proximally facing coupling-in face that cooperates with a vibrating object, namely a sonotrode, during the step of causing energy to impinge. The sonotrode may optionally include a guiding protrusion cooperating with an indentation in the coupling-in face to guide the connector relative to the sonotrode.

The liquefaction of the flow portion in this is primarily caused by friction between the vibrating second object and the surface of the first object, which friction heats the first object superficially.

In a group of embodiments, the connector and/or a portion of the second and/or first object against which the connector is pressed comprises, at the surface that during the pressing and vibrating is in direct contact with the first object, structures serving as energy directors, such as edges or tips, such as energy directors known from ultrasonic welding or for the "Woodwelding" process as, for example, described in WO 98/42988 or WO 00/79137 or WO 2008/080 238.

For coupling mechanical vibrations into the connector, the connector may include a coupling-in structure. Such a coupling-in structure may be a coupling-in face, especially, constituted by a proximal-most end face, with or without guiding structures (such as a guiding hole for an according protrusion of the tool), for a sonotrode.

Other forms of energy that impinge in addition to the mechanical vibration energy are not excluded, for example radiation energy that is coupled in through the connector and absorbed at the interface to the first object.

The first and/or second building layer may (if applicable) be comparably hard and essentially non-porous so that it does not include any structure or only little structure penetrable by the thermoplastic material for anchoring the connector in the first building layer after re-solidification of the thermoplastic material.

In a group of embodiments, the connector includes a head portion or other laterally protruding proximal feature. Such laterally protruding feature may serve as stopping feature, i.e. the energy input (especially the mechanical vibration) may be stopped as soon as a distally facing shoulder of the head portion (or other laterally protruding proximal feature) comes into physical contact with the first building layer or with the proximal surface of a second object to be bonded to the first object by the connector.

Such a second object may optionally include a generally flat sheet portion with an opening. Such sheet portion may lie directly against the proximal surface of the second building layer and be in physical contact with it. Alternatively, a further part, such as a thin sheet or membrane, may be placed between the first object and the sheet portion.

In the step of bringing a distally facing surface portion of the connector into contact with the low density layer, a shaft portion of the connector may be caused to extend through the opening of the second object, and/or after the step of stopping the energy transfer the second object may be clamped between the first object and a distally facing surface portion of the connector. This opening, through which the connector extends after the process, may be a through opening or may be a recess that is open to a lateral side (such as a slit or similar).

Generally, the connector may be a classical connector for connecting a second object to a first object. To this end, the connector, as mentioned, for example may include a head portion that defines a distally facing shoulder so that a second object having an opening through which the connector reaches is clamped between the first object and the head portion. Alternatively, the connector may include a connecting structure, such as an inner or outer thread, a bayonet coupling structure, a structure allowing a click-in connection or any other suitable connecting structure. In these cases, the connecting structure may optionally be formed as part of a portion of the connector, which portion is not of the thermoplastic material.

In addition or as an alternative to being such a classical connector, the connector may be an integral part of a second object that itself has a dedicated function—for example, the connector may be a connecting peg protruding from a surface of such second object. The connector may also connect a comparably small further object to the first object, for example a sensor or actuator or light source and/or other element, which further object may be integrated in the body of the connector.

More in general, the connector may have an anchoring portion (that is pressed into the low density layer during the process) and a functional structure. The functional structure may be a connecting structure or include a functional element, such as a sensor or actuator.

The connector may include a plate-like body, from which the anchoring portion protrudes towards distally, and proximally whereof the functional structure is arranged, wherein the body portion includes a proximally facing coupling-in face into which during anchoring the pressing force is coupled.

Also, the connector may have a distally facing abutment face, and wherein moving the connector into a distal direction relative to the first object stops in a condition in which the abutment face rests against a corresponding proximally facing structure of the first object. Such abutment face may be constituted, for example, by a body portion of the mentioned kind.

In a group of embodiments, the functional structure may be off-center with respect to an insertion axis. An orientation of the connector relative to the insertion axis may be fixed/defined during the step of applying the second pressing force. This is readily possible because in contrast to approaches where a connector is inserted by rotation, the orientation in approaches according to the present invention may be defined, and, as mentioned, the connector may be introduced without substantial rotation.

The first object, the connector, and, if applicable, the second object are construction components (construction elements) in a broad sense of the word, i.e. elements that are used in any field of mechanical engineering and construction, for example automotive engineering, aircraft construction, shipbuilding, building construction, machine construction, toy construction etc. Generally, the objects as well as the connector will all be artificial, man-made objects. The use of natural material such as wood-based material is thereby not excluded.

The flow portion of the thermoplastic material is the portion of the thermoplastic material that during the process and due to the effect of the mechanical vibrations is caused to be liquefied and to flow. The flow portion does not have to be one-piece but may include portions separate from each other, for example at the distal end of the connector and at a more proximal place.

For applying a counter force to the pressing force, the first object may be placed against a support, for example a non-vibrating support. According to a first option, such a support may include a supporting surface vis-à-vis the spot against which the connector is pressed, i.e. distally of this spot. This first option may be advantageous because the bonding can be carried out even if the first object by itself does not have sufficient stability to withstand the pressing force without substantial deformation or even defects. However, according to a second option, the distal side of the first object may be exposed, for example by the first object being held along the lateral sides or similar.

In embodiments, the first object is placed against a support with no elastic or yielding elements between the support and the first object, so that the support rigidly supports the first object.

In this text the expression "thermoplastic material being capable of being made flowable e.g. by mechanical vibration" or in short "liquefiable thermoplastic material" or "liquefiable material" or "thermoplastic" is used for describing a material including at least one thermoplastic component, which material becomes liquid (flowable) when heated, in particular when heated through friction i.e. when arranged at one of a pair of surfaces (contact faces) being in contact with each other and vibrationally moved relative to each other, wherein the frequency of the vibration has the properties discussed hereinbefore. In some situations, for example if the connector has to carry substantial loads, it may be advantageous if the material has an elasticity coefficient of more than 0.5 GPa. In other embodiments, the elasticity coefficient may be below this value.

Thermoplastic materials are well-known in the automotive and aviation industry. For the purpose of the method according to the present invention, especially thermoplastic materials known for applications in these industries may be used.

A thermoplastic material suitable for the method according to the invention is solid at room temperature (or at a temperature at which the method is carried out). It preferably includes a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g. fibres or particles of material which has no thermoplastic properties or has thermoplastic properties including a melting temperature range which is considerably higher than the melting temperature range of the basic polymer.

In this text, generally a "non-liquefiable" material is a material that does not liquefy at temperatures reached during the process, thus especially at temperatures at which the thermoplastic material of the connector is liquefied. This does not exclude the possibility that the non-liquefiable material would be capable of liquefying at temperatures that are not reached during the process, generally far (for example by at least 80° C.) above a liquefaction temperature of the thermoplastic material or thermoplastic materials liquefied during the process. The liquefaction temperature is the melting temperature for crystalline polymers. For amorphous thermoplastics the liquefaction temperature (also called "melting temperature in this text") is a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s)), of the thermoplastic material.

For example, a non-liquefiable material may be a metal, such as aluminum or steel, or wood, or a hard plastic, for example a reinforced or not reinforced thermosetting polymer or a reinforced or not reinforced thermoplastic with a melting temperature (and/or glass transition temperature) considerably higher than the melting temperature/glass transition temperature of the liquefiable part, for example with a melting temperature and/or glass transition temperature higher by at least 50° C. or 80° C. or 100° C.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride, polyethylene, polypropylene, and polystyrene, or copolymers or mixtures of these.

In addition to the thermoplastic polymer, the thermoplastic material may also include a suitable filler, for example reinforcing fibers, such as glass and/or carbon fibers. The fibers may be short fibers. Long fibers or continuous fibers may be used especially for portions of the first and/or of the second object that are not liquefied during the process.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

Mechanical vibration or oscillation suitable for embodiments of the method according to the invention has preferably a frequency between 2 and 200 kHz (even more preferably between 10 and 100 kHz, or between 20 and 40 kHz) and a vibration energy of 0.2 to 20 W per square millimeter of active surface. The vibrating tool (e.g. sonotrode) is e.g. designed such that its contact face oscillates predominantly in the direction of the tool axis (longitudinal vibration) and with an amplitude of between 1 and 100 µm, preferably around 30 to 60 µm. Such preferred vibrations are e.g. produced by ultrasonic devices as e.g. known from ultrasonic welding.

In this text, the terms "proximal" and "distal" are used to refer to directions and locations, namely "proximal" is the side of the bond from which an operator or machine applies the mechanical vibrations, whereas distal is the opposite side. A broadening of the connector on the proximal side in this text is called "head portion", whereas a broadening at the distal side would be a "foot portion".

In this text, generally the term "underneath" a layer is meant to designate a space distally of this layer if the proximal side is defined to be the side of the layer from which it is accessed during the process. The term "underneath" thus is not meant to refer to the orientation in the earth gravity field during the manufacturing process.

"Vertical" is used to denote directions perpendicular to a main plane of the first object, defined by the plane along which the layers (low density layer; first/second building layers, if applicable) extend. The term of course does not restrict the orientation in which the first object is kept during the anchoring process and/or during use. "Horizontal" us used to refer to in-plane directions.

The present invention in addition to the method also concerns a machine that is configured to carry out the method. Such machine includes a sonotrode with a coupling-out face, a source of mechanical vibration configured to cause the sonotrode to vibrate, and a pressing force mechanism to apply the pressing forces by pushing the sonotrode forward. The machine is configured and programmed to carry out the method as claimed and described in this text, including controlling the pressing force in the manner described and claimed herein.

BRIEF DESCRIPTION OF THE DRAWINGS

In the following, ways to carry out the invention and embodiments thereof are described referring to drawings. The drawings are schematic in nature. In the drawings, same reference numerals refer to same or analogous elements. The drawings show:

FIGS. 23-26 views of further connectors;

DESCRIPTION OF THE PREFERRED EMBODIMENTS

Figure 1:
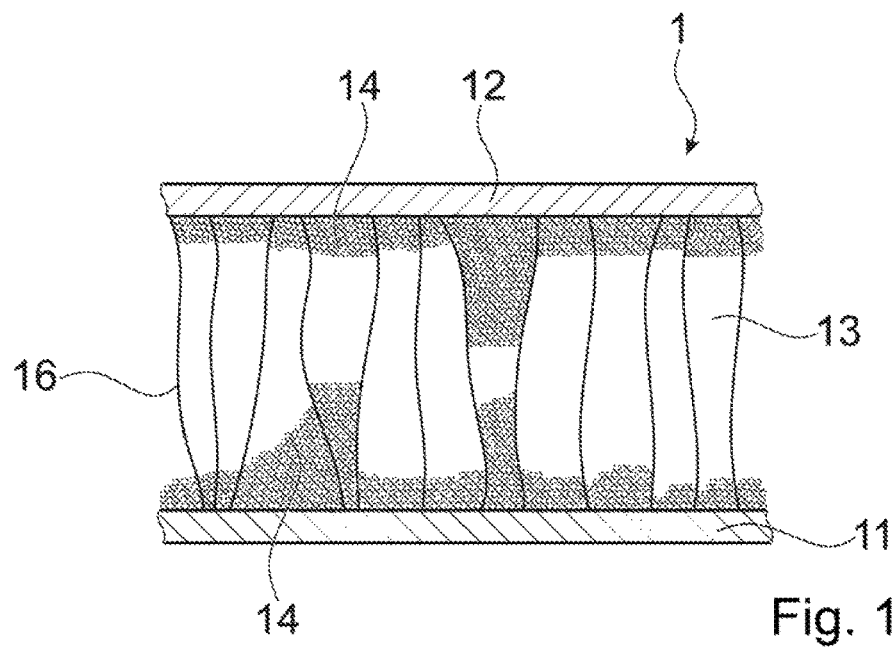
FIG. 1, in vertical cross section, an example of a first object being a sandwich board.

FIG. 1 shows a first object 1 being a sandwich board with a first building layer 11, a second building layer 12, and an interlining 13 between the building layers.

The building layers may be of a fiber composite, such as a glass fiber composite. The building layers will, for example, not be liquefiable under the conditions that apply during the process described herein, i.e. do not have any thermoplastic properties or be liquefiable only at temperatures substantially above the temperatures at which the liquefiable material of the connector liquefies. The building layers may be homogeneous or may themselves be layered thus heterogeneous.

Figure 2:
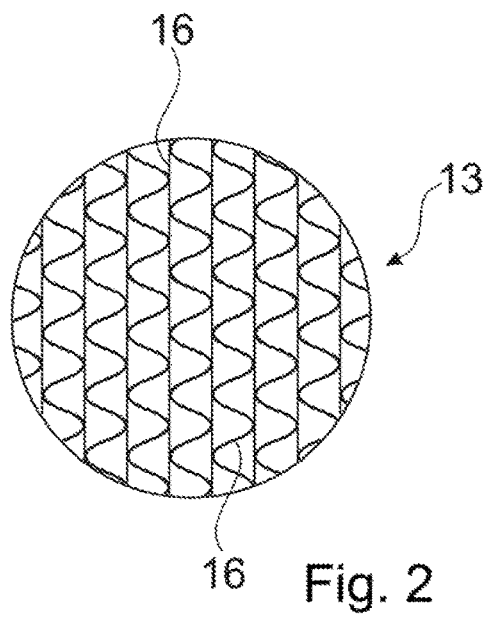
FIGS. 2-4 horizontal cross sections through interlining layers of sandwich boards.
Figure 3:
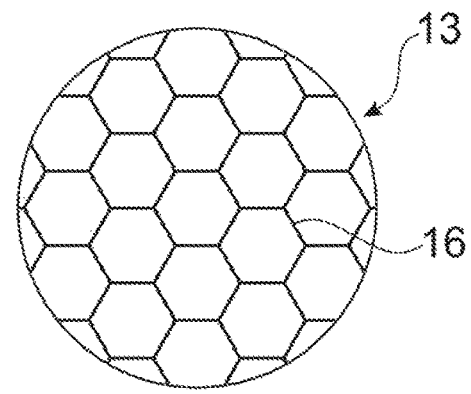
Figure 4:
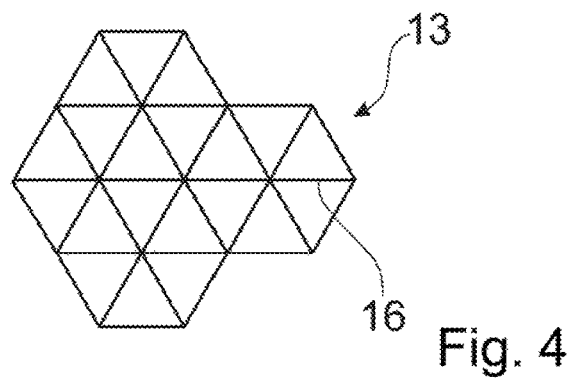

The interlining 13 constitutes a low density layer. In the depicted embodiment, it includes an arrangement of cardboard walls 16 extending essentially vertically, i.e. perpendicularly to the building layers. FIGS. 2-4 depict, by showing schematical horizontal cross sections across the interlining 13, possible structures of such vertically extending wall elements, including corrugated (FIG. 2), honeycomb (FIG. 3), and triangle structure (FIG. 4); many other structures are possible.

Instead of being of cardboard, the interlining 13 may also be of another material, such as of plastics or of a composite. Also a foam interlining is possible.

For connecting the cardboard walls or other open structure of the interlining 13 to the building layers 11, 12, the interlining further includes an adhesive 14. In the shown embodiment, the adhesive 14 is a foam, for example a foam based on polyurethane (PUR). Especially, the adhesive may be a thermoplastic adhesive, such as a thermoplastic polyurethane foam. However, the adhesive may also be of a not thermoplastic material, for example a thermosetting polyurethane.

Additional elements, such as a barrier foil/web of the interlining at the interface to the building layer(s) may be present.

Figure 5A:
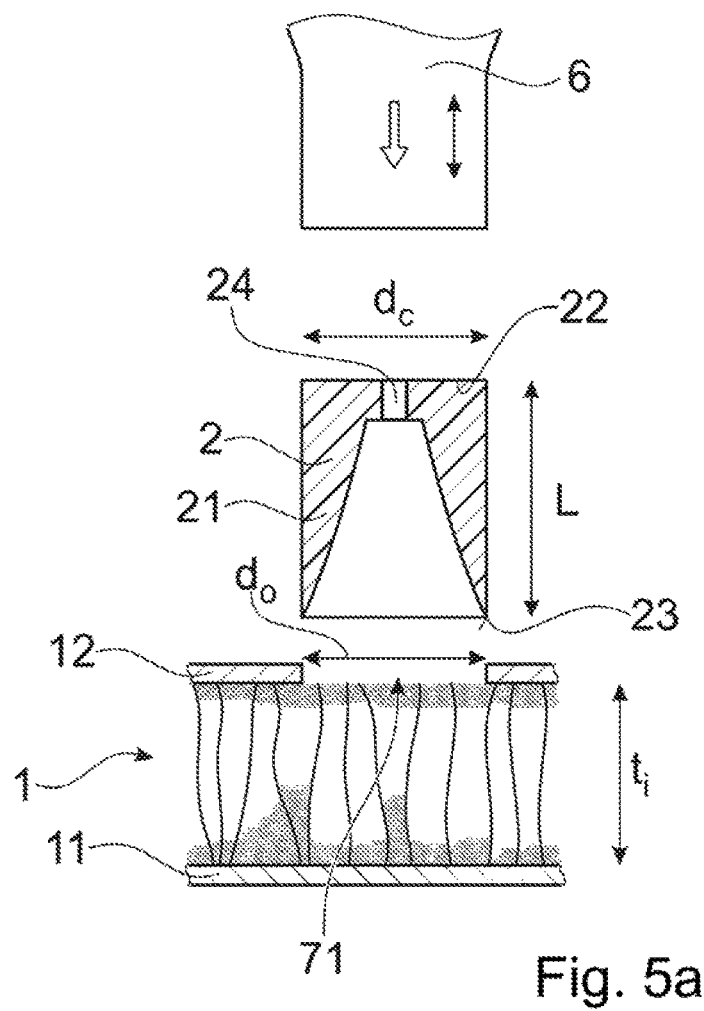
FIGS. 5a and 5b a configuration for carrying out the method during two different stages.

FIG. 5a shows the configuration of the first object 1, the connector 2 and a tool, namely a sonotrode 6, at the onset of the process. The face of the first object 1 that in the depicted orientation in the figures is the upper face is denoted as the proximally facing face in this text. The connector 2 is bonded to the first object 1 from the proximal side. The second building layer 12 of the first object is locally removed to yield an access hole 71 underneath which the interlining 13 is exposed. The access hole has an (average) diameter do and a shape adapted to the shape of the connector. For example, if the connector is symmetrical about an insertion axis the access hole 71 may be circular.

The access hole 71 may, for example, be produced by drilling.

The connector 2 has a distal portion 21, here being essentially tube shaped with a wall that tapers towards the distal end to form a distal edge 23, and further has a proximal portion 22 that forms a proximally facing coupling face for the sonotrode 6.

The connector 2 of includes thermoplastic material at least on a distal end thereof. It may for example consist of the thermoplastic material.

In the depicted embodiment, the proximal portion has a through opening 24 whereby the connector as a whole is cannulated along the axial direction. An average outer diameter of the connector $d_c$ may optionally be slightly larger than the diameter of the opening, whereby the opening is slightly undersized.

The sonotrode may include a (not shown) protrusion cooperating with the opening 24 to guide the connector 2 during the process.

A length L of the connector 2 is chosen to be greater than a total thickness $t_i$ of the interlining 13, and also greater than a total thickness of the interlining plus the second building layer 12.

For the process, the sonotrode 6 is pressed against the proximally facing coupling face, and mechanical vibrations are coupled into the sonotrode, for example as soon as a certain trigger pressing force has been reached. The joint application of the vibration and of the pressing force cause the following (compare FIG. 5b):

The distal end of the connector 2 is pressed into the material of the interlining thereby disrupting (cutting/rupturing etc.) portions of the interlining 13 and especially deforming wall portions 16 to run into directions different from vertical. Thereby, at positions where the connector 2 is pressed into the interlining 13, a compressed portion 19 of the interlining 13 is caused.

Thermoplastic material of the connector 2 is caused to become flowable (yielding the flow portion) and to penetrate into structures of the interlining 13, including structures of the compressed portion 19. The flow portion in the depicted embodiment includes a main flow portion 26 that is formed towards the first building layer 11 and an optional additional flow portion 27 that is caused at the rim of the second building layer 12 because of the undersized opening.

If the adhesive 14 is of a thermoplastic material capable of welding to the thermoplastic material of the connector, a weld is caused between the flow portion and the adhesive 14.

In addition or as an alternative to the weld, an adhesive connection may be caused between the flow portion and the adhesive. The adhesive properties of the material pairing including the adhesive and the thermoplastic material of the connector of course depend on the chosen material and thereby may be tailored by choosing the appropriate material pairing.

In addition or as yet another alternative, the flow portion may be caused to penetrate (also) into structures of the adhesive 14. For example, if the adhesive forms an open porous foam, the flow portion may be caused to penetrate into the pores of the foam (this of course does not imply that all of the flow portion ends in pores, rather generally the flow portion will flow into pores as well as hollow spaces between the adhesive and the other material of the interlining and/or into such other material, for example by cardboard soaking up thermoplastic material).

The length of the connector L is reduced by distal portions of it becoming flowable, forming the main flow portion 26 and being displaced into the structure of the interlining, including the compressed portion 19 thereof.

Figure 5B:
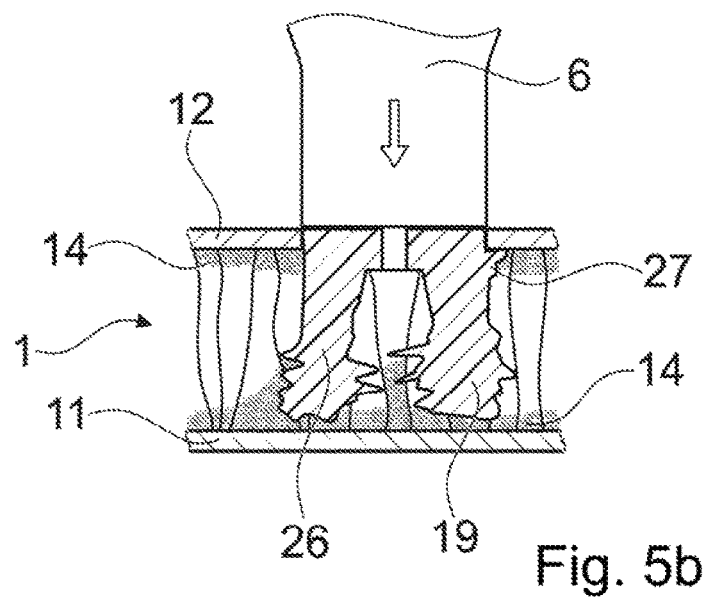

After some time, especially after a pre-determined condition is met, the vibration energy input stops. Such pre-determined condition may be:

The sonotrode 6 and thereby the sonotrode-connector interface has reached a pre-defined position. In FIG. 5b, this condition is met as soon as the proximal surface of the connector is flush with the second building layer 12.

Figure 8:
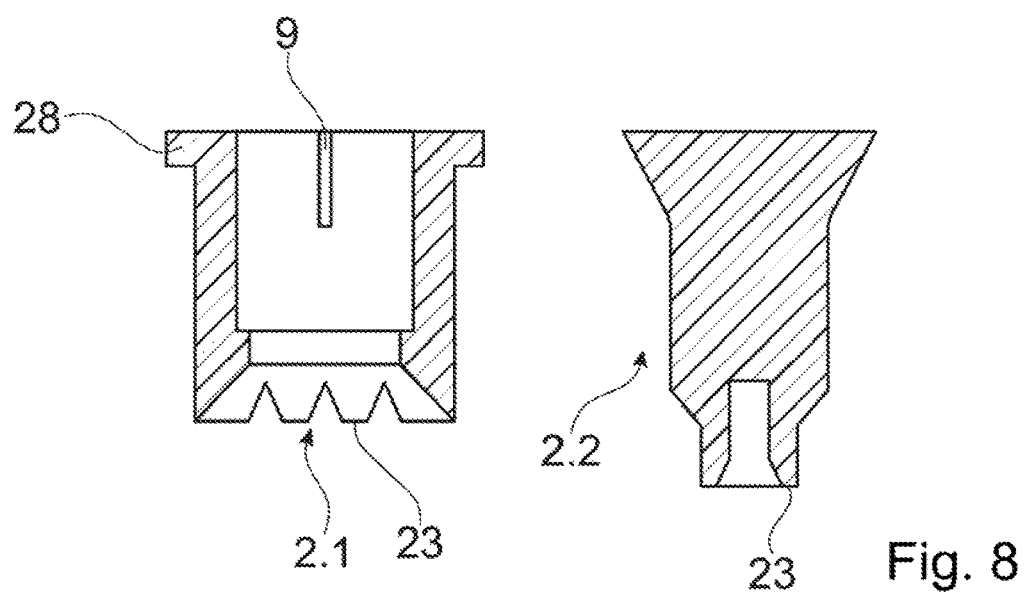

A stop is reached, for example of a distally facing shoulder formed by a head portion of the connector abuts against the rim of the second building layer 12 (compare for example FIG. 8 with the head portion 28 forming an outwardly protruding collar).

The force that has to be applied to move the connector forward reaches a certain value triggering an end of the energy input. Such stop triggering value may be a maximum value or a minimum value.

A feedback of the vibration generating apparatus driving the sonotrode indicates that a certain criterion is met, for example if the vibration properties of the connector show that a pre-defined portion has become flowable or that a length of the portion that has remained solid has fallen below a threshold level.

Combinations of these are possible; for example two or more of the above conditions may be combined with an "OR" combination.

After the vibration input stops, the pressing force in many embodiments is maintained for some more time. FIG. 5b shows the configuration during this step of maintaining the pressing force. In this, the pressing force may be kept constant or follow a certain force profile, for example the force may be chosen so that the position of the connector does not change any more or that the connector is pressed further into the interlining by a controlled movement. Especially, the pressing force may be maintained until the flow portion has sufficiently re-solidified for possible remaining elastic forces acting on the connector by the interlining are suppressed by the dimensional stability of the re-solidified thermoplastic material.

As mentioned, a joint effect of the vibration and the pressing force is that a portion of the thermoplastic material becomes flowable. This is due to external friction between the thermoplastic material and the interlining (and possible also between the thermoplastic material and the second building layer 12 and/or the first building layer 11) and internal friction within the thermoplastic material that have absorbed mechanical vibration energy and heated the flow portion up to a temperature at which it is flowable. After the re-solidification, a positive-fit connection between the connector and the material of the interlining, including the compressed portion, and possibly also between the connector and the first and/or second building layer, results, whereby the connector is anchored in the first object.

Figure 6:
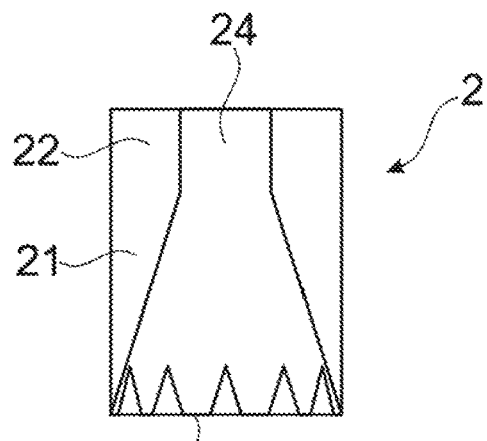
FIG. 6 a side view of an alternative connector.

The connector 2 shown, in a side view, in FIG. 6 differs from the connector of FIG. 5a in that the distal edge 23 is not formed along a full closed contour but is interrupted by notches, whereby it is formed in a crown-like manner.

Thereby, its energy directing characteristics are different and, depending on the first object material, may be more pronounced.

Figure 7:
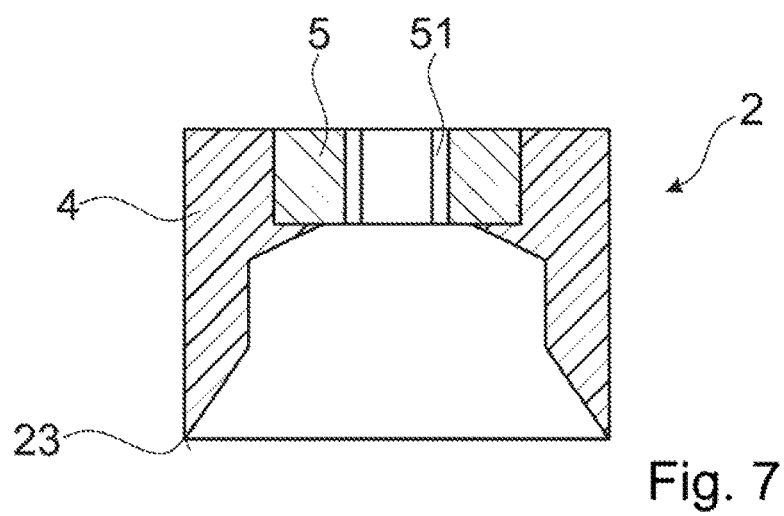
FIGS. 7 and 8 vertical cross sections of yet further connectors.

FIG. 7 schematically depicts the option that the connector 2 in addition to a liquefiable portion (thermoplastic portion 4) may include a non-liquefiable portion 5. In FIG. 7, this non-liquefiable portion is illustrated to be a metal nut 5, for example of a suitable steel, including an inner thread 51. More in general, a non-liquefiable portion may have any functional structure adapted to the particular needs. As an alternative to a nut, the non-liquefiable portion may include a screw sticking out of the thermoplastic portion, for example to the proximal side.

In either case, the connector then serves as anchor for connecting another part to the first object.

FIG. 8 illustrates the possibility that the connector is initially not one-part but includes a plurality of parts. In FIG. 8, the connector includes a sleeve portion 2.1 and a piston portion 2.2. Both, the sleeve portion 2.1 and the piston portion 2.2 in the depicted embodiment each include a distal edge for being pressed into the interlining material and for thereby serving as an energy director. For the process, the piston portion 2.2 may be pressed into the sleeve portion 2.1 with mechanical vibration energy acting on the proximal end face of the piston portion. This may result in a local radial extension of the sleeve portion 2.1 (assisted by a slit 29) and ultimately in a weld between the sleeve portion and the piston portion.

The sleeve portion 2.1 in FIG. 8 is illustrated to have a proximal head portion 28 that forms an outwardly protruding collar that after the anchoring process abuts against a rim around the opening of the first object. Alternatively, a further, second object with a through opening may be placed proximally on the first object and clamped between the head portion 28 and the first object to be fastened to the first object by the connector.

Such a head portion 28 is an option also for other embodiments of the present invention than two-part connectors, including embodiments of the kind illustrated in FIG. 5a/5b (then, the connector will, in the anchored condition, not be flush with the second building layer 12 but the distally facing shoulder formed by the head portion will abut against the second building layer 12 or, if applicable, the further, second object. Also in embodiments like the one of FIG. 6 or 7 or as described hereinafter, the head portion is an option.

Figure 9:
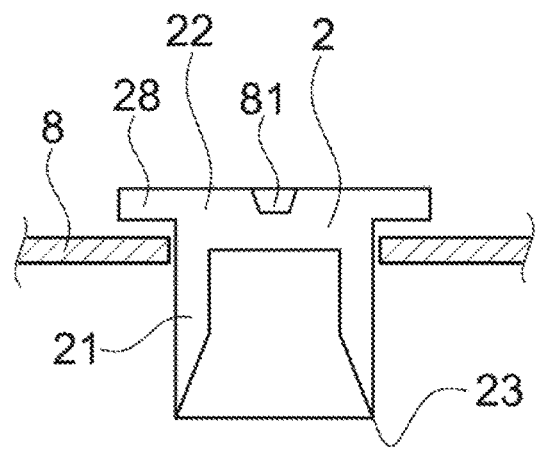
FIG. 9 a vertical cross section through another connector and a second object.
Figure 10:
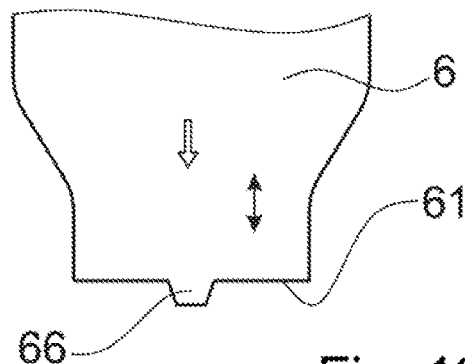
FIG. 10 a vertical cross section through a distal portion of a sonotrode.

The connector 2 of FIG. 9 comprises, in addition to a head portion 28 for securing a second object 8 to the first object a further, optional feature (that is independent of the head portion 28 and is an option for any embodiment of the present invention). Namely, the proximally facing coupling-in face of the connector 2 as a guiding indentation 81 cooperating, during the process steps, with a corresponding guiding protrusion 66 (see FIG. 10) of the sonotrode 6 and protruding from the coupling-out face 61 of the sonotrode.

Figure 11:
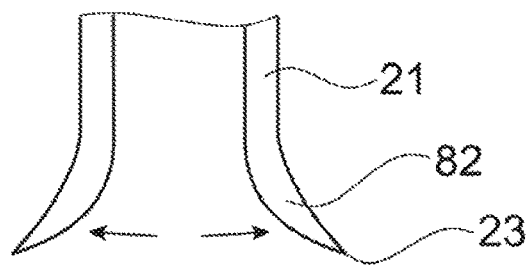
FIGS. 11-13 vertical cross sections through connectors or portions thereof.

FIG. 11 depicts the option of a distal end section 82 of the distal portion 21 being deformed to be bent outwardly (arrows) during a the step of causing the connector to penetrate into the low density layer. This may cause a larger footprint of the anchoring that results after the process and thereby enhance the stability of the anchoring.

Figure 12:
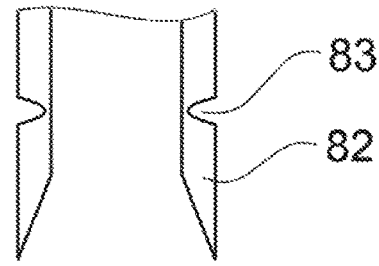

To assist such deformation, the connector may be designed to be collapsible, as illustrated in FIG. 12. To this end, the connector has a circumferential groove 83 that constitutes a systematical weakening at a position between the distal end section 82 that is to be deformed and the rest of the connector.

An additional effect of a distal end of the connector being collapsible is that it may assist in causing the first building layer 11 to remain intact in the process also if the distal edge 23 is comparably sharp and hard for penetration of the low density layer.

Figure 13:
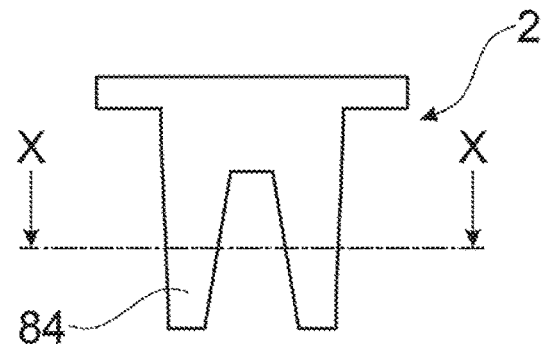
Figure 14:
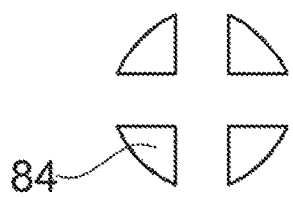
FIGS. 14 and 15 horizontal cross sections through connectors.
Figure 15:
Figure 16:
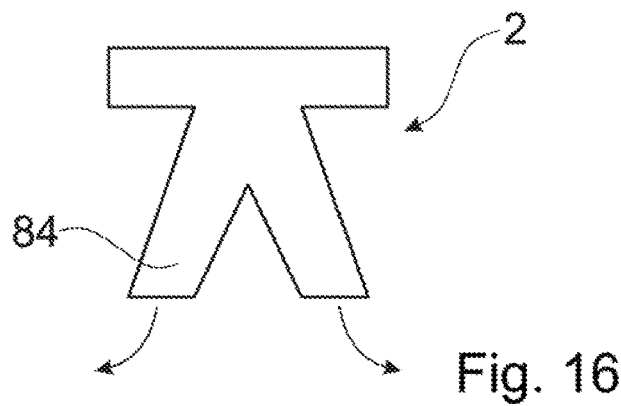
FIG. 16 a vertical cross section through an even further connector.

FIG. 13 schematically illustrates the possible concept of the connector having outwardly deformable legs 84 that after an initial softening following penetration of the first building layer become capable of being deformed, especially outwardly. FIG. 14 shows a horizontal cross section through the distal portion of the connector having the leg portion (along the plane X-X in FIG. 11). FIG. 15 shows a possible alternative cross section through the distal portion of the connector having the deformable legs 84. FIG. 16 depicts the principle referring to a connector with two leg portions 84, wherein the arrows show the direction of deformation after the initial softening.

Figure 17:
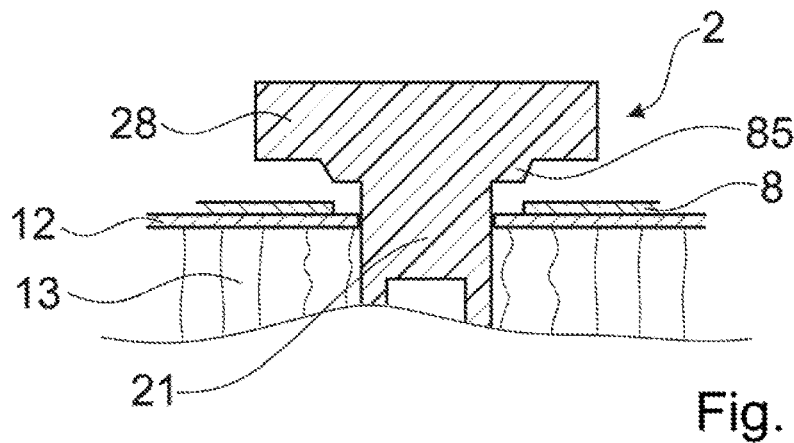
FIGS. 17-19 vertical cross sections through arrangements with further connectors.

Yet another principle is described referring to FIG. 17. The connector 2 has a plug portion 85 distally of the collar 28 (head), which plug portion is dimensioned to have a slightly larger cross section (at least with respect to one in-plane dimension) than the opening in the second object 8 to be secured to the first object. The cross section of the plug portion is, however, is substantially larger than a cross section of the portion distally thereof, which distal portion 21 penetrates into the first object during the process. The plug portion towards the end of the process is pressed into the opening, wherein the mechanical vibration energy and pressing force cause a tight connection between the plug portion and the second object.

The plug portion 85 may be circumferential and continuously compact. Alternatively, it may be structured, for example by including a plurality of radially running ribs that in addition to serving as the plug portion may have energy directing properties. This may be of special interest in case the building layer is not homogenously dense but, for example, consists of a consolidated fleece/PP/glass fiber composition.

The tight connection between the plug portion and the second object and/or an according tight connection between the plug portion and the second building layer 12 may include one or more of: a press fit, a polymer-polymer weld connection, an interpenetration of material of the second object/first building layer by molten and re-solidified material of the plug portion.

In FIG. 17, the connector 3 is depicted to consist of the thermoplastic material.

In either case, the connection between the plug portion and the second object 2 may cause a seal between proximally of the second object 8 (and/or the second building layer 12) and distally thereof.

Figure 18:
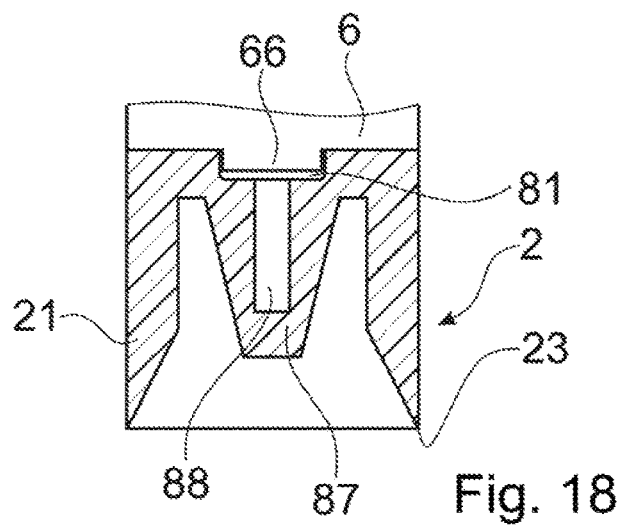

FIG. 18 illustrates a further example of a connector 2 with a guiding indentation 81 and a sonotrode 6 with a corresponding guiding protrusion 66. Distally of the guiding indentation 81 the connector also a fastening hole 88 and proximally thereof. It would alternatively also be possible to use the fastening hole as guiding indentation.

A fastening hole extends from the proximal end inwardly. The fastening hole 88 may be a through hole (through opening 24, see FIG. 5a for example) or a blind hole (FIG. 16), depending on the construction. A fastening hole 24, 81 may serve for a screw or other fastener (including fastening portions of a further object to be connected to the first object) to be inserted therein, whereby the connector may serve as anchor for a further object connected to the first object. This may optionally be combined with the collar/head discussed hereinbefore that may serve for securing a second object to the first object. The fastening hole 81 may optionally include a thread or other fastening structure.

The embodiment of FIG. 18, independent of the principle of the fastening hole, has an other special feature: The connector 2 has a head or body portion with the guiding indentation 81 and a distally protruding 21 with the distal edge 23. In contrast for example to the embodiment of FIG. 5a, the connector further includes a fastener receiving portion 87 that is formed as a central distal protrusion extending distally from the head or body portion. In the fastener receiving portion 87, there is formed the fastening hole 88. The fastening hole may serve for inserting a fastener, such as a screw or a pin. Depending on the properties of the fastener to be used and on material properties of the connector, the fastening hole may include an according structure, for example an inner thread.

Instead of a fastening hole, or in addition thereto, the connector may have an other fastening structure, for example a make fastening structure instead of a female fastening structure (for example a threaded bar or similar). An according sonotrode used may have an according indentation that receives such fastening structure and thereby avoids the direct coupling of vibration into the fastening structure.

Figure 19:
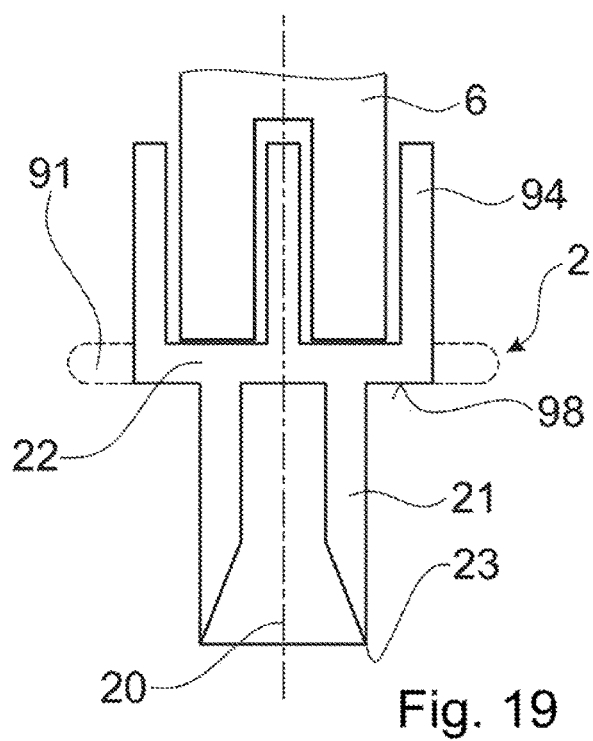
Figure 20:
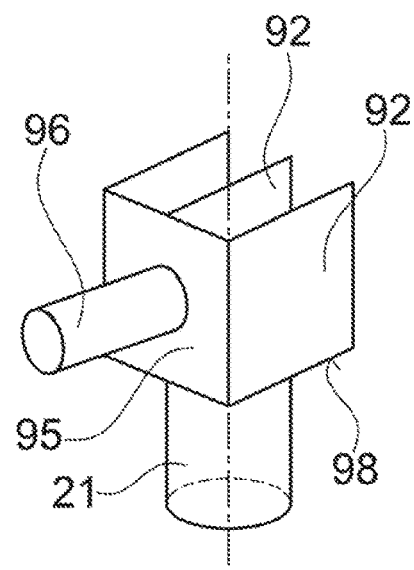
FIG. 20 a view of a connector.

The connector 2 shown in FIGS. 19 and 20 is an example of a connector that in addition to an anchoring structure (which includes the thermoplastic material that during the process is made flowable and, if applicable, the punching structure) also includes a connecting structure defining a connecting location, especially a connecting location defined with respect to all dimensions (x,y.z). The connecting structure in the depicted embodiment is constituted by a connector peg 96 one-piece with the anchoring structure.

The connecting structure—the connecting peg 96 in the shown embodiment—is especially such that it is arranged laterally. This means that the arrangement of the connecting structure 96 is not symmetrical with respect to the insertion axis 20 but is off-center with respect to the axis 20. The insertion axis 20 is the axis along which generally the pressing force is applied during insertion and along which the movement during insertion will take place at least predominantly. The insertion axis 20 is generally central with respect to the punched-out portion.

Thereby, the position of the connecting location depends on the angle of rotation around the axis 20. Hence, in contrast to most of the embodiments discussed hereinbefore, when the connector relative is positioned relative to the first object and anchored therein, not only the position but also its orientation may have to be defined.

An example of an according connecting structure may, for example, be a structure (like the peg) that protrudes away from the anchoring structure into a defined direction, such as a pivot of a hinge or similar, a structure for clipping an other item onto, an anchor for a thread connection, etc.

The connector 2 of FIGS. 19 and 20 includes a plate-like body portion 22 defining a distally facing abutment face 98. From the abutment face 98, a distal portion 21 having the distal edge 23 protrudes towards distally. Towards proximally, the connector includes a base wall 95 from which the connecting peg 96 protrudes laterally. The base wall 95 is arranged off-center with respect to the axis 20. Further, the connector includes a plurality of reinforcing walls 92 extending perpendicularly to the base wall 95 and enhancing the mechanical stability with respect to forces acting on the connecting peg.

The distally facing abutment face defines the z position of the connecting structure after the process in that the pressing force is applied until the abutment face 98 abuts against a proximally facing surface portion of the object.

The connector 2 in the embodiment of FIGS. 19 and 20 as well as the connectors of the embodiments of FIGS. 21 and 21 hereinafter may, for example, be a mount of a rear parcel shelf of an automobile.

The sonotrode 6 used for anchoring the connector may be shaped to be adapted to the shape of the connector. Especially, as shown in FIG. 19, the connector may be shaped to impinge, from proximally, on the body portion 22 by engaging between the reinforcing walls 92 and the base wall 95. In addition or as an alternative, it would also be possible to provide a protruding collar 91 of the connector 2, as shown in dotted lines in FIG. 19. The arrangement with the sonotrode engaging between the walls directly on the body portion 22 with the sonotrode having indentations for reinforcing wall(s) if necessary, though, features the advantage that the pressing force and vibration are coupled straight into the anchoring portion.

In embodiments that include a connecting location the position and/or orientation of which depends on the orientation of the connector around its axis 20, it may be necessary to guide the orientation of the connector during the anchoring process, because due to the vibration input the connector may be subject to some uncontrolled twisting movements during insertion. In the embodiment of FIGS. 19 and 20, the base wall 95 and/or the reinforcing walls 92 may be used for this, together with a corresponding shape of the sonotrode, whereby the orientation of the sonotrode defines the orientation of the connector.

Figure 21:
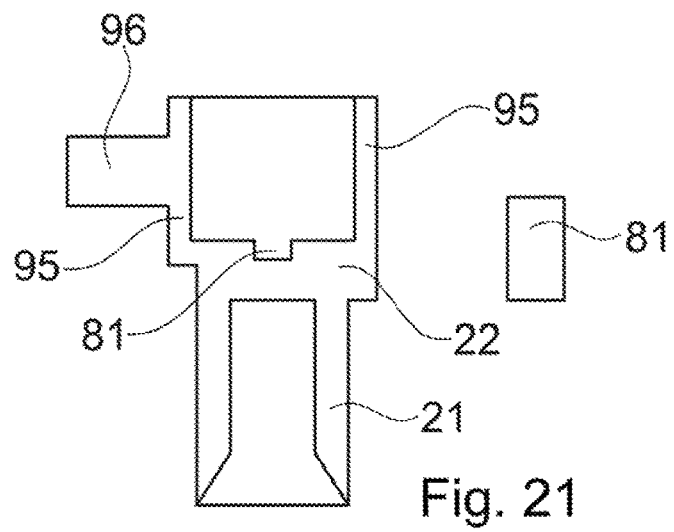
FIG. 21 a vertical cross section and a guiding hole geometry of an even further connector.

In addition or as an alternative, as sketched in FIG. 21 (where the right panel depicts an enlarged top view on the guiding indentation 81), the connector and the sonotrode may include guiding structures that are not circularly symmetrical, such as a rectangular guiding protrusion of the sonotrode engaging with a corresponding guiding indentation 81 of the connector. Other shapes of guiding protrusion and guiding indentation are possible, including any shapes known for screw heads, including hexagonal, star-shaped, etc.

The embodiment of FIG. 21 includes an annular base wall 95 from which the connecting peg 96 protrudes outwardly, the base wall following a, for example, circular or rectangular contour and thereby defining a pot-like structure with the connector body defining the bottom of the pot, wherein the sonotrode during the process is pressed against this bottom.

Figure 22:
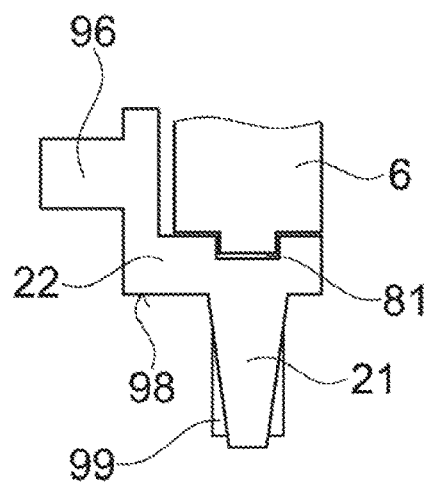
FIG. 22 a vertical cross section through a connector and a sonotrode.

The embodiment of a connector sketched in FIG. 22 has a proximal portion similar to the corresponding structure of the embodiment of FIG. 21, but with a base wall that is not annular.

Independent thereof, the anchoring structure includes an anchoring structure distal portion 21 that has the shape of a tapering pin, optionally with a plurality of axially running energy directors, namely wings 99, protruding radially.

The embodiments of FIGS. 19-22 include using a sonotrode adapted to the geometry of the connector. This is not always necessary. FIG. 23 shows an embodiment in which the body portion 22 forms a generally flat coupling surface for a generic sonotrode.

The embodiment of FIG. 23 has additional features that can be realized independently or in combination with each other and/or with other features illustrated in FIG. 23:

- The connector 2 has a plurality of distal anchoring portions 21, namely two anchoring portions. Each of these anchoring portions is constituted by a tube portion with a distal edge.
- More in general (this pertains to any embodiment of the present invention), the anchoring portion(s) may form a punching edge that makes initial penetration of the anchoring portion(s) into the low density layer easier. Such punching edge, if formed by the thermoplastic material of the connector, may be caused to be liquefied during the process so that after during the process the punching edge disappears and is not manifest any more after the process when the connector is anchored.
- The tube portions(s) is/are not circular but have an approximately rectangular outer contour. Generally, any cross section may be used.
- The distal edge is not sharp but blunt.
- The connector in addition to the anchoring portion(s) has a process controlling abutment protrusion 101. In FIG. 23, this abutment protrusion together with the cutting elements forms a tripod whereby when the connector is brought into contact with the first building layer, the connector position is well-defined and stable.
  - An abutment protrusion 101 of this kind may, during the subsequent process, collapse or melt away. It does not necessarily have to penetrate into the low density layer, and it does not need to have any piercing property.
  - In addition to stabilizing the connector during an initial stage of the process, it also dampens undesired bending vibrations when the connector body 22 has a substantial lateral extension.

FIG. 24 shows a connector that is based on the principle described referring to FIGS. 19-22. In contrast to the embodiments of these figures, the connecting structure is not a peg but a fastening hole in the base wall 95.

In the embodiment of FIG. 25, the connector instead of the plate-like body portion and the walls (ribs) shown in FIGS. 19-24, the connector has a closed housing 102 that is for example either itself off-center with respect to the insertion axis or that houses a functional structure that is off-center with respect to this axis, or both.

In FIG. 25, the functional structure that is off-center with respect to the axis 20 is not a connecting structure but another functional part. FIG. 25 very schematically illustrates two parts shown in dotted lines within the housing. Such functional structure may include a sensor, an antenna, a light source, a camera, an acoustic converter etc.

Embodiments with a closed housing as shown in FIG. 25 may be provided with means for coupling the vibration energy from the proximally facing end face of the housing to the distal portion (distal anchoring portion) 21, for example tube portion. FIG. 26 illustrates an example of a connector 2—that in the depicted embodiment has a connecting peg 96—of which the distal portion 21 extends through the housing to the proximal end face of the connector. The housing in this may be open towards distally. If the housing is open distally, the abutment portion of the functional portion is constituted by the distal edges of the vertical walls of the housing.

Other solutions of coupling vibration energy from the proximal end face into the anchoring portion are possible, such as vertical reinforcing walls extending through the housing or other vertical structures.

Figure 27:
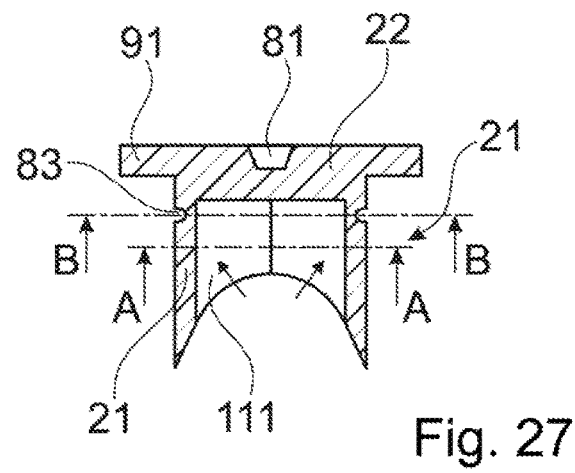
FIG. 27 a vertical cross section through an even further connector.

In the embodiment of FIG. 27, the tube-like distal portion 21 is stabilized by at least one stabilizer rib 111. Especially if the low density layer is comparably strong, such stabilizer structure may prevent the tube portion (that optionally may include a plurality of legs) from collapsing during the initial stage of being pressed into the low density layer.

As also illustrated in FIG. 27, the stabilizer structure may in addition be shaped so as to exert an outwardly (with respect to radial directions) directed pressure during the step of pressing the connector into the low density layer. The bow-shaped, concave contour in the illustrated example will cause such outward pressure when the connector is pressed into material of the low density layer, as illustrated by the arrows in FIG. 27.

Figure 28:
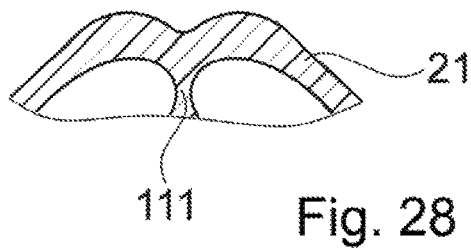
FIGS. 28 and 29 partial horizontal cross sections of the connector of FIG. 27.

FIG. 28, showing a detail of a possible cross section along the plane A-A in FIG. 27, illustrates that the distal anchoring portion 21 of a connector does not need to be circular in cross section. Rather, in the embodiment of FIG. 28, the connector has an axially running notch at the position where a stabilizer rib 11 is connected to the tube—shaped part of the anchoring portion 21. By this, an outward pressing of the thermoplastic material of the anchoring portion by the directed pressure may be favored.

Figure 29:
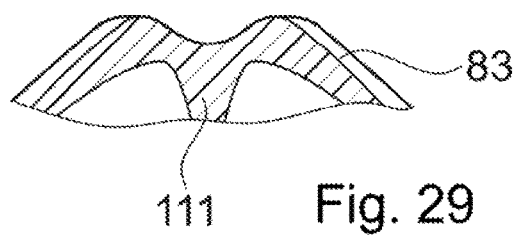

FIG. 29 shows a detail of a possible cross section along the plane B-B in FIG. 27. The circumferential groove 83 need not necessarily run around the entire periphery but may be interrupted, especially where a stabilizer rib 111 is connected to the tube portion.

Figure 30:
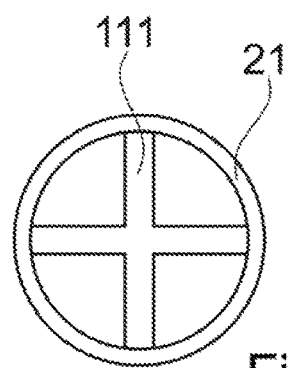
FIGS. 30 and 31 horizontal cross sections through further connectors.

FIG. 30 shows a possible horizontal cross section through a connector. The combination of a circular geometry and the stabilizer ribs 111 in a crossed arrangement is especially stable.

Figure 31:
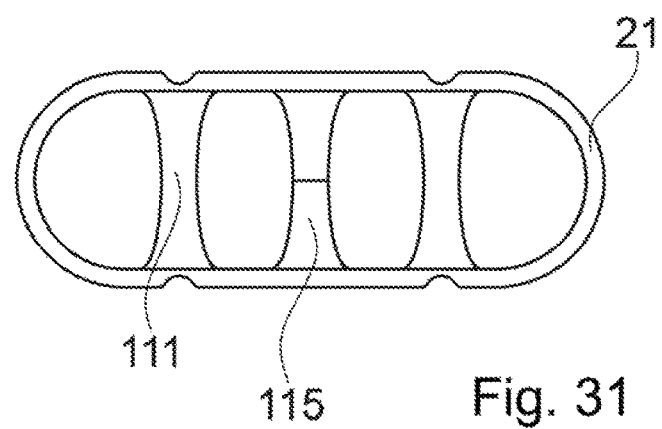

FIG. 31 illustrates a cross section of a cross section through an alternative anchoring portion, which anchoring portion does not have circular symmetry but is oblong in cross section. In such embodiments, especially a stabilizer structure, such as a stabilizer rib 111 arranged as shown in FIG. 31 may be advantageous.

Figure 32:
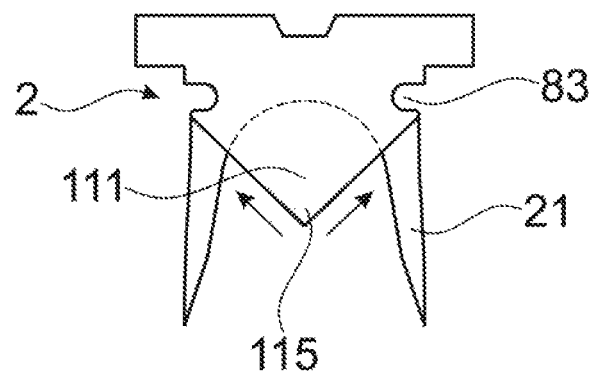
FIG. 32 a vertical cross section through yet another connector.

FIG. 32 illustrates a connector that has a stabilizer rib 111 that is pointed towards a distally facing tip 115 or edge so that interlining material penetrated by the connector during the process is forced into the direction of the arrows and thereby exerts an outward pressure on the tube shaped part of the anchoring portion 21 or the legs, respectively.

Figure 33:
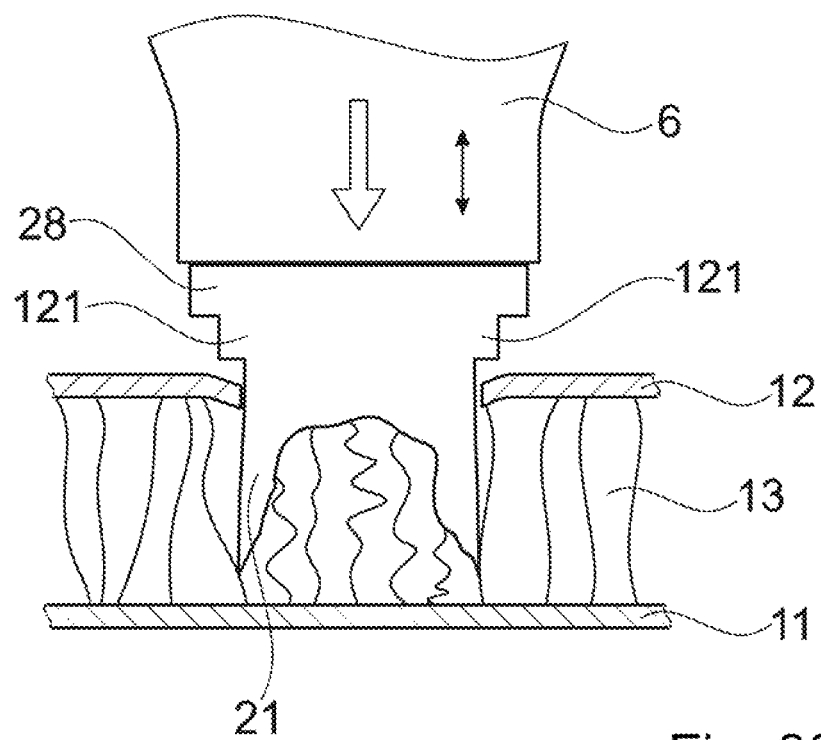
FIG. 33, in vertical cross section, a further arrangement with a connector.

The embodiment of FIG. 33 deals with a situation in which the object has a proximal, second building layer, and the access hole in the second building layer 12 has a diameter approximately corresponding to a diameter of the distal part of the anchoring portion 21. The connector in addition to the collar 28 has a step feature 121 forming a shoulder of the distal portion 21 on the radial-outer side. This step feature will come into physical contact with the second building layer 12 as soon as the connector has advanced into the first object 1 to a sufficient extent, especially towards the end of the forward (towards distally) movement. As a consequence, due to friction between the vibrating connector and the second building layer 12, energy will be absorbed, and thermoplastic material of the connector becomes flowable near the second building layer. The flow portion will therefore include portions in a proximal region and especially immediately distally of the first building layer. This may come in addition or as an alternative to the measures, for example, described referring to FIG. 27 or 32 which measures also contribute to a generation of a flow portion and a radial flow immediately distally of the second building layer 12.

Figure 34:
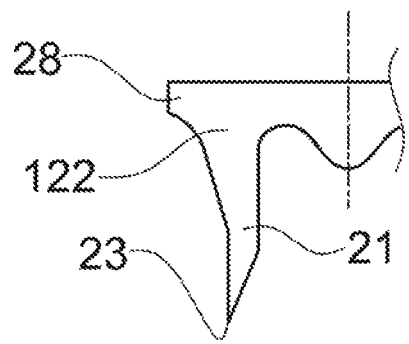
FIGS. 34 and 35 partial vertical cross sections of even further connectors.

In addition or as an alternative to an outward step 121, the connector 2 may include an outward taper 122, as shown in FIG. 34.

Figure 35:
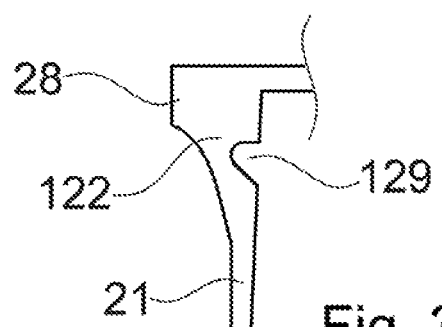

Optionally, in addition to such outward feature (step 121, taper 122), the connector may include an inner feature, such as an inner groove 129 assisting the collapse immediately distally of the second building layer. FIG. 35 illustrates an example. Other structures, including measures described hereinbefore, may optionally be combined with this.

Figure 36:
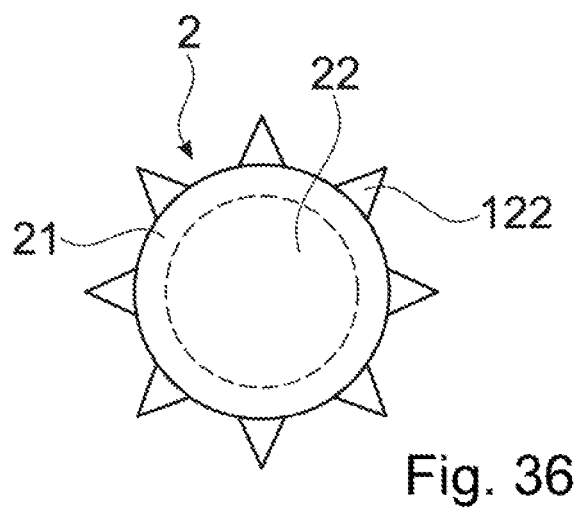
FIG. 36 a horizontal cross section through a connector.

FIG. 36, schematically illustrating a top view (view from the proximal side) of the connector 3 shows the principle that the mentioned outward features (step 121, taper 122) may be formed as radial protrusions, for example distributed around the periphery. As an alternative, such outward features may also be circumferential, i.e. extend continuously around the periphery.

The outward features of the kind discussed referring to FIGS. 33-36 may cause involving the second building layer 12 in the process of making thermoplastic material flowable and possibly causing a collapse of the connector.

Figure 37:
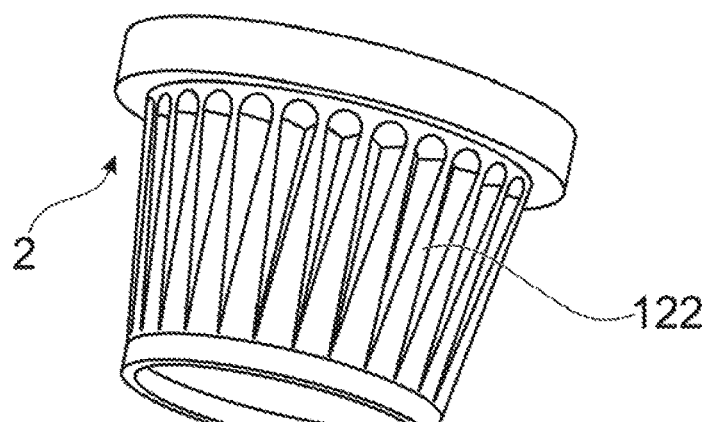
FIGS. 37 and 38 views of embodiments of connectors.
Figure 38:
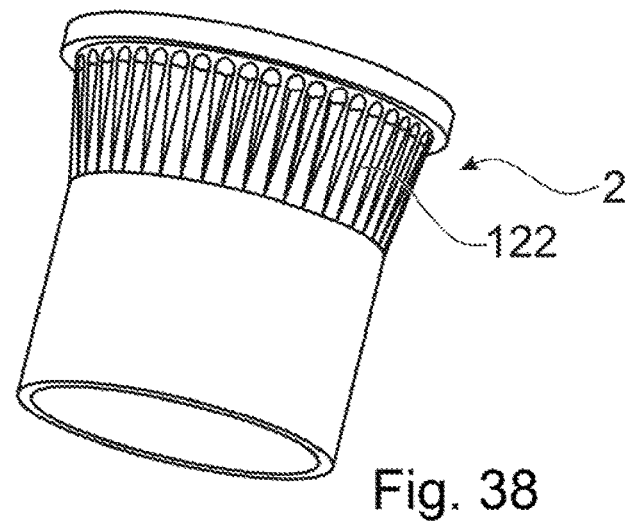

FIGS. 37 and 38 show examples of connectors 2 based on the principles described referring to FIGS. 34-36. Further examples include connectors with an outward taper 122 with smooth outer surface, i.e. without the axially running ribs that form the taper. Also in such embodiments, the tapered section may reach essentially to the distal end (as in FIG. 37) or alternatively may be restricted to a more proximal region (as in FIG. 38).

Figure 39:
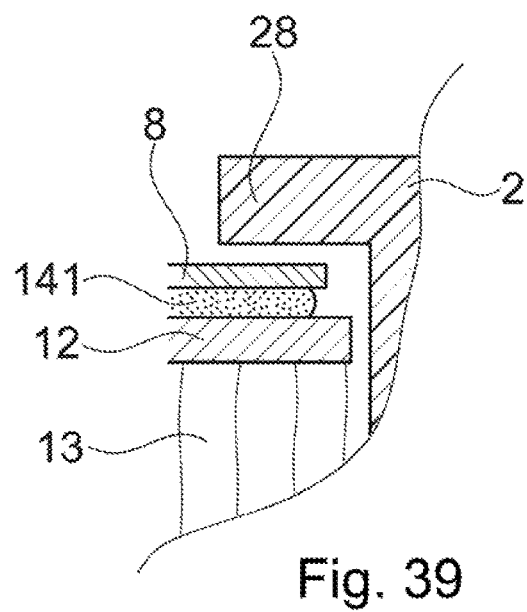
FIGS. 39 and 40 partial vertical cross sections through an even further arrangement with a connector.

FIG. 39 schematically illustrates a further variant in which a second object 8 is attached to the first object by the connector. Namely, an adhesive 141, for example in a flowable state, is applied between the first and second objects.

Thereby, an adhesive connection and the concept of securing the second object by a connector according to the invention are combined. This may, for example, be useful if in a manufacturing process the second object is glued to the first object by the adhesive, but the assembly of the first and second objects are to be processed immediately after having been assembled together. The connector applied according to the invention provides initial stability sufficient for subsequent production steps.

The energy input and pressing force during the final stage of the hereinbefore described anchoring process may cause a flow of the adhesive applied between the first and second objects (and/or between the distal surface of the collar 28 (if any) and the second object, in special embodiments). This may be used in the following manner:

A gap or fractures/fissures etc. between the second building layer 12 and the connector 2 may be filled by the adhesive and thereby 'healed'. This is illustrated in FIG. 40.

Figure 40:
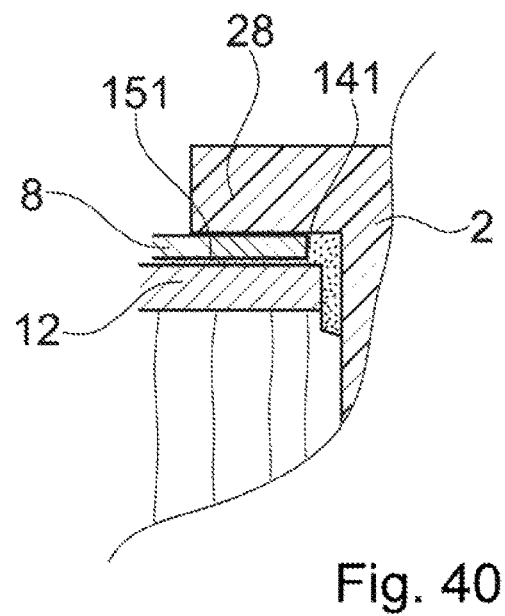

In addition or as an alternative, roughness 151 of the second building layer 12 is caused to be interpenetrated by the adhesive 141, thereby enhancing the stability of the adhesive connection (see also FIG. 40).

As alternative to sandwich board the first object may, for example, be a structure of a low density foam layer, wherein the foam material is, for example, plastically deformable, supported by a first building layer and, for example, sandwiched between such first building layer and a second building layer.

The hereinbefore described embodiments generally include the step of deforming discrete elements of the low density layer, which deformed elements then become part of an intertwined structure with the liquefiable material to anchor the connector in the first element. In this, the deformation of the discrete elements may make a substantial contribution to the anchoring strength in that it contributes to a higher density and/or forms macroscopic undercuts.

Figure 41:
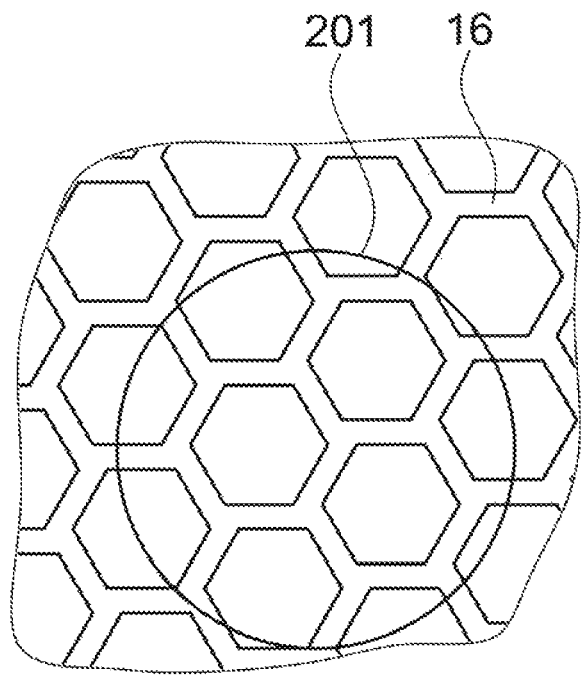
FIG. 41 a horizontal cross section through a part of a first object being a sandwich board.
Figure 42:
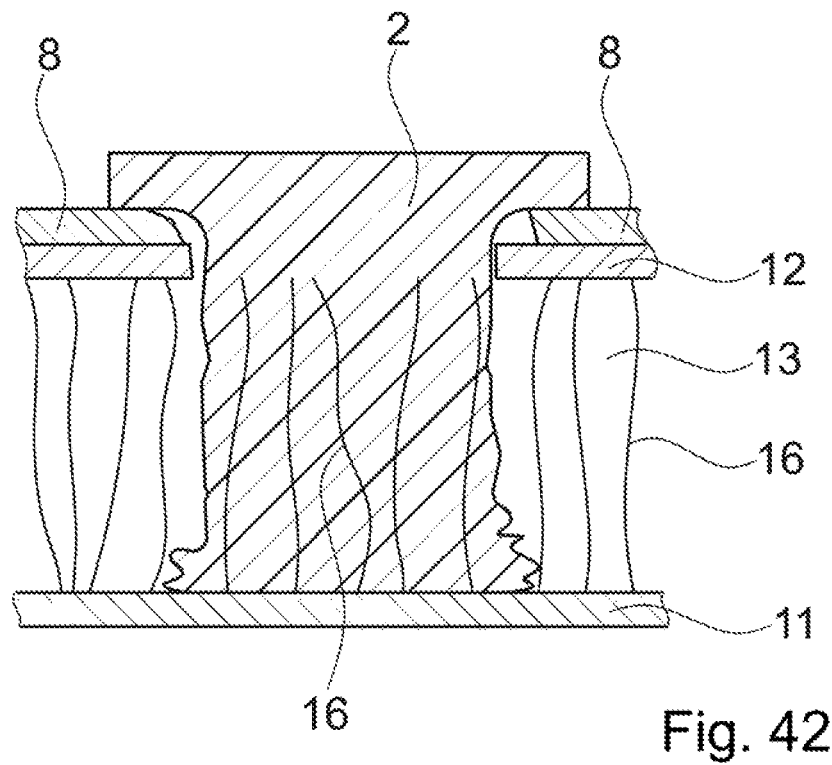
FIG. 42 a vertical cross section through an arrangement with a sandwich board as illustrated in FIG. 39.

However, the integration of discrete elements in a structure with the liquefied, re-solidified thermoplastic material may in embodiments lead to a substantial anchoring strength also if the deformation of the discrete elements does not make a substantial contribution thereto. This is illustrated in FIGS. 41 and 42. FIG. 41 shows a horizontal section through a low density layer with a honeycomb structure. The discrete elements are vertical walls of for example cardboard or a plastic or a plastic composite. Due to the honeycomb structure, they are comparably stable with respect to deformations. The circular line 201 in FIG. 41 illustrates the possible position of a distal connector end face that may be pressed into the low density layer.

When the connector 2 is pressed against the low density layer while energy impinges, the proximal edges of the walls form energy directors, whereby the thermoplastic material of the connector predominantly liquefies near these edges, so that the connector can be pressed forward into the low density layer. Especially if the discrete elements are vertical structures (as is the case in FIGS. 39 and 40) and depending on the ratio between energy input and pressing force, this may lead to a situation where the deformation of the discrete elements 16 is not substantial. FIG. 42 illustrates the connector 2 anchored in the first object after the thermoplastic material has re-solidified. The discrete elements 16 integrated into material of the connector still form essentially vertical walls.

In these embodiments, the anchoring may be caused by a combination of:
  a positive fit connection of the thermoplastic material with the material of the discrete elements (the discrete elements include deviations from a perfectly vertical shape, plus they include surface structures (roughness, porosity as in honeycomb structures made from cardboard or stiff paper, etc.) interpenetrated by the liquefiable material),
  possibly of an adhesive connection between the thermoplastic material and the discrete elements and/or
  a force fit connection (the thermoplastic material jams the discrete elements), and
  possibly a positive fit or other connection with the first and/or second building layers.

What is claimed is:

1. A method of anchoring a connector in a first object, wherein the first object comprises a low density layer that comprises an arrangement of discrete elements and gas-filled spaces between the discrete elements, the method comprising the steps of:
  providing the first object and providing the connector, the connector having a liquefiable material that is liquefiable by mechanical vibration;
  bringing the connector into contact with the low density layer;
  pressing the connector against the low density layer and coupling mechanical vibration energy into the connector to cause the connector to penetrate into the low density layer to deform the discrete elements, until a flow portion of the liquefiable material becomes flowable and is caused to interpenetrate spaces between the deformed discrete elements so that an intertwined structure of the liquefiable material and the deformed discrete elements results; and
  stopping the mechanical vibration energy and causing the flow portion to re-solidify to anchor the connector in the low density layer.

2. The method according to claim 1, wherein the discrete elements comprise walls extending substantially parallel to a proximodistal direction, wherein in the step of pressing the connector, the connector is pressed into a distal direction.

3. The method according to claim 1, wherein the first object is a sandwich element comprising a first building layer and a second building layer sandwiching the low density layer.

4. The method according to claim 3, wherein in the step of providing the first object, the first object is provided with a portion of the second building layer removed to yield an access hole and thereby an exposed portion of the low density layer, and wherein bringing the connector into contact with the low density layer comprises bringing the connector into contact with the low density layer through the access hole.

5. The method according to claim 4, wherein the access hole is undersized with respect to a cross section of the connector.

6. The method according to claim 3, wherein a pressing force is chosen so that the first building layer is not penetrated by the connector.

7. The method according to claim 1, wherein the low density layer comprises a foam adhesive in addition to the discrete elements, and wherein the flow portion is caused to interpenetrate pores of the foam adhesive and/or to be welded to the foam adhesive.

8. The method according to claim 1, and comprising maintaining a pressing force after the step of stopping the mechanical vibration.

9. The method according to claim 1, wherein the connector comprises a proximal portion with a proximally facing coupling-in face and a distal portion located distally of the proximal portion, wherein the distal portion is hollow and is in the form of a sleeve.

10. The method according to claim 1, wherein a distal end of the connector forms a distally facing edge.

11. The method according to claim 1, wherein the liquefiable material is thermoplastic material, and wherein the connector comprises a body of a non-liquefiable material that does not liquefy at temperatures reached during the method, the body comprising an attachment structure for anchoring a further object relative to the first object.

12. The method according to claim 1, comprising the further steps of providing a second object with an opening, and of placing the second object relative to the first object,
  wherein in the step of bringing the connector into contact with the low density layer, a shaft portion of the connector is caused to extend through the opening of the second object, and
  wherein after the step of stopping the mechanical vibration energy and causing the flow portion to re-solidify, the second object is clamped between the first object and a distally facing surface portion of the connector.

13. The method according to claim 1, wherein the step of pressing the connector against the low density layer and coupling mechanical vibration energy into the connector is carried out without any substantial rotation of the connector.

14. The method according to claim 1, wherein a vibration is longitudinal vibration.

15. The method according to claim 1, wherein the connector has a head portion or a laterally protruding proximal feature, and wherein the head portion or the laterally protruding proximal features serves as a stopping feature, wherein an energy input is stopped as soon as a distally facing surface portion of the head portion or other laterally protruding proximal feature comes into physical contact with a first building layer or with a proximal surface of a second object.

16. The method according to claim 1, wherein a pressing force is applied by a tool comprising a guiding structure cooperating with a complementary guiding structure of the connector to define a lateral (x-y) position of the connector relative to the tool, wherein the tool is a sonotrode.

17. A method of anchoring a connector in a first object, wherein the first object comprises a first building layer and a low density layer adhering to the first building layer, the low density layer comprising a structure that includes gas-filled cavities, wherein a first density of the first building layer is higher than a second density of the low density layer, the method comprising the steps of:
   providing the first object and providing the connector, the connector having a liquefiable material that is liquefiable by mechanical vibration;
   bringing the connector into contact with the low density layer;
   pressing the connector against the low density layer and coupling mechanical vibration energy into the connector to cause the low density layer to be compressed between the connector and the first building layer to yield a compressed portion of the low density layer, wherein the compressed portion has a compressed structure, until a flow portion of the liquefiable material becomes flowable and is pressed into structures of the compressed portion;
   stopping the mechanical vibration energy and causing the flow portion to re-solidify to anchor the connector in the compressed portion that maintains the compressed structure.

18. The method according to claim 17, wherein the first object is a sandwich element comprising a second building layer, the first and second building layers sandwiching the low density layer, and
   wherein in the step of providing the first object, the first object is provided with a portion of the second building layer removed to yield an access hole and thereby an exposed portion of the low density layer, and
   wherein bringing the connector into contact with the low density layer comprises bringing the connector into contact with the low density layer through the access hole.

19. A method of anchoring a connector in a first object, wherein the first object comprises a low density layer and a proximal building layer, the low density layer comprising a structure of elements and gas-filled spaces, the method comprising:
   providing the first object with the proximal building layer locally removed or disrupted to yield an access hole in the proximal building layer to gain access to the low density layer, without removing the low density layer,
   providing the connector, the connector having a liquefiable material that is liquefiable by mechanical vibration;
   bringing the connector into contact with the low density layer;
   pressing the connector against the low density layer and coupling mechanical vibration energy into the connector to cause the connector to penetrate into the low density layer, until a flow portion of the liquefiable material becomes flowable and is caused to interpenetrate spaces between the elements so that an intertwined structure of the liquefiable material and the elements results; and
   stopping the mechanical vibration energy and causing the flow portion to re-solidify to anchor the connector in the low density layer.

20. The method according to claim 19, wherein the first object is a sandwich board in which a first building layer and the proximal building layer, being a second building layer, sandwich the low density layer.

21. The method according to claim 19, wherein the step of pressing and coupling mechanical vibration energy into the connector also causes a deformation of the elements, wherein the interpenetrated spaces are spaces between the deformed elements, so that the intertwined structure of the liquefiable material and the deformed elements results.

22. The method according to claim 19, wherein the structure of elements of the low density layer is a structure of vertical walls, and
   wherein the step of pressing and coupling mechanical vibration energy into the connector comprises pressing the connector in a direction parallel to the walls, and
   wherein the step of pressing and coupling mechanical vibration energy into the connector comprises controlling a pressing force and a vibration energy input so that the vertical walls penetrate into the liquefiable material and the liquefiable material fills spaces between the vertical walls.

23. The method according to claim 19, wherein the vertical walls form a honeycomb structure.

* * * * *